US006216089B1

(12) United States Patent
Minerbo

(10) Patent No.: US 6,216,089 B1
(45) Date of Patent: Apr. 10, 2001

(54) METHOD AND APPARATUS FOR PRODUCING A CONDUCTIVITY LOG UNAFFECTED BY SHOULDER EFFECT AND DIP FROM DATA DEVELOPED BY A WELL TOOL

(75) Inventor: Gerald N. Minerbo, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/391,149

(22) Filed: Sep. 7, 1999

(51) Int. Cl.$^7$ ...................................................... G01V 3/38
(52) U.S. Cl. .................................................................. 702/7
(58) Field of Search ................................... 324/338, 339; 702/7, 10, 11, 12, 13

(56) References Cited

U.S. PATENT DOCUMENTS

| | | |
|---|---|---|
| 3,056,917 | 10/1962 | Tanguy . |
| 3,147,429 | 9/1964 | Moran . |
| 3,179,879 | 4/1965 | Tanguy . |
| 3,340,464 | 9/1967 | Gouilloud . |
| 4,472,684 | 9/1984 | Schuster . |
| 4,583,045 | 4/1986 | Gianzero . |
| 5,041,975 | 8/1991 | Minerbo et al. . |
| 5,115,198 | 5/1992 | Gianzero et al. . |
| 5,157,605 | 10/1992 | Chandler et al. . |
| 5,184,079 | 2/1993 | Barber . |
| 5,210,691 | 5/1993 | Freedman et al. . |
| 5,757,191 | 5/1998 | Gianzero . |

OTHER PUBLICATIONS

Moran, J.H. and K.S. Kunz, "Basic Theory of Induction Logging and Application to Study of Two–Coil Sondes", *Geophysics*, vol. XXVII, No. 6, Part 1 (Dec. 1962), pp. 829–858.

Anderson, Barbara et al., "Effect of Dipping Beds on the Response of Induction Tools", *SPE Formation Evaluation* (Mar. 1988), pp. 29–36.

Clark, B. et al., "Electromagnetic Propagation Logging While Drilling: Theory and Experiment", SPE Paper 18117, presented at the 63$^{rd}$ Annual Technical Conference and Exhibition, Oct. 2–5, 1988, pp. 103–117.

Anderson, Barbara et al., "Response of 2–MHZ LWD Resistivity and Wireline Induction Tools in Dipping Beds and Laminated Formations", SPWLA 31$^{st}$ Annual Logging Symposium, Jun. 24–27, 1990, Paper A, pp. 1–25.

Hunka, J.F. et al., "A New Resistivity Measurement System for Deep Formation Imaging and High–Resolution Formation Evaluation", SPE Paper 20559, presented at the 65$^{th}$ Annual Technical Conference and Exhibition of the SPE, Sep. 23–26, 1990, New Orleans, pp. 295.

Meyer, W. Hal, et al., "A New Slimhole Multiple Propagation Resistivity Tool", SPWLA 35$^{th}$ Annual Logging Symposium, Jun. 19–22, 1994, Paper N.

Barber, Thomas D. et al., "Interpretation of Multiarray Induction Logs in Invaded Formations at High Relative Dip Angles", *The Log Analyst*, vol. 40, No. 3 (May–Jun. 1999), pp. 202–217.

Primary Examiner—Donald E. McElheny, Jr.
(74) Attorney, Agent, or Firm—Victor H. Segura

(57) ABSTRACT

A method and apparatus for producing a conductivity log, unaffected by shoulder effect and dip, from voltage data developed by a well tool disposed in a borehole. The method involves accessing the voltage data developed by the tool, processing the data, reconstructing two-coil voltage data, and computing differences of the two-coil data, to derive a conductivity profile representative of the formation. The apparatus forms part of a well logging system including a well tool adapted to be moveable through a borehole. The apparatus being coupled to the well tool and adapted with means to access voltage data developed by the receivers disposed on the well tool. The apparatus further adapted with means for boosting the voltage data, means for reconstructing two-coil voltages from the boosted voltage data, means for processing the reconstructed two-coil voltage data, and means for producing a conductivity log from the processed two-coil voltages.

28 Claims, 20 Drawing Sheets

METHOD AND APPARATUS FOR PRODUCING A CONDUCTIVITY LOG UNAFFECTED BY SHOULDER EFFECT AND DIP FROM DATA DEVELOPED BY A WELL TOOL

BACKGROUND OF THE INVENTION

1. Field of the Invention

This invention relates to the field of well logging and, more particularly, to well logging methods and apparatus for determining formation properties, such as conductivity, in high-contrast thin-layer formations or at high dip angles, with greater accuracy than prior methods. Still more particularly, this invention relates to an improved method for processing multiple voltage data obtained during logging with an induction array well tool and creating a depth tagged representation of resistivity or conductivity from a formulated difference of the voltage data. The invention has general application in the well logging art, but is particularly useful at a well site while logging.

2. Description of Related Art

Induction logging is a well-known form of electromagnetic logging used to make a determination of the conductivity (or its inverse, resistivity) profile of the earth formations surrounding a borehole. U.S. Pat. Nos. 3,340,464; 3,147,429; 3,179,879; 3,056,917; and 4,472,684 are illustrative of typical well logging tools that utilize the basic principles of induction logging.

Conventional induction logging tools or "sondes" include a transmitter and a receiver array consisting of a set of coils mounted on a support and axially spaced from each other in the direction of the borehole. The transmitting coil is energized by an alternating current, which in turn generates an electric field that induces eddy currents in the formation surrounding the borehole. The intensity of the eddy currents is proportional to the conductivity of the formation. The field generated in turn by these eddy currents induces an electromotive force in the receiving coil. Phase-locked detection, amplification, and digitization of this signal determines the amplitude and phase of the receiver voltage, usually expressed as a complex number (phasor voltage). By processing the receiver coil voltages, an evaluation of the formation conductivity profile is obtained. U.S. Pat. No. 5,157,605 (assigned to the present assignee) discloses an induction array well tool that may be used to develop voltage data for processing by the present invention.

Conventional techniques for evaluating the conductivity of formations have practical limitations. Neighboring layers in high-contrast (in terms of resistivity) thin-layer formations can corrupt the measurement results—known as shoulder effect. At high dip angles, horns and other artifacts are seen in the resistivity logs. Modeling and actual measurements have confirmed these effects. See B. Anderson et al., *Response of 2-MHz LWD Resistivity and Wireline Induction Tools in Dipping Beds and Laminated Formations*, SPWLA THIRTY-FIRST ANNUAL LOGGING SYMPOSIUM, Pp. 1–25, 1990. The cause of the horns is transverse magnetic ("TM") coupling, which becomes important at high dip angles. The TM horns observed are useful to detect layer boundaries, but are detrimental for quantitative formation evaluation.

U.S. Pat. No. 5,041,975 describes a method for correcting data developed by the well tool of the '605 patent, to eliminate the effects of the borehole on the measured data. U.S. Pat. No. 5,184,079 describes a method for correcting logs, developed from a logging tool, disposed in a wellbore at a dip angle relative to the formation layers, to eliminate the effects of the dip angle on the resistivity logs. The applicability of this correction method is limited to dip angles less than about 45 degrees. Another method for correcting induction logs with high apparent dip angle effects was described by Barber et al., *Interpretation of Multiarray Induction Logs in Invaded Formations at High Relative Dip Angles*, SPWLA THIRTY-NINTH ANNUAL LOGGING SYMPOSIUM, June, 1998. This method requires time-consuming model calculations, making it less desirable for operations at the well site while logging. An underlying criterion of the methods described by the '079 patent and Barber et al. is the requirement that the dip angle be known before the methods can be applied.

It is desirable to obtain a simplified method of processing data, acquired from a well tool, to correct for dip effect and neighboring layers in high-contrast thin-layer formations. Still further, it is desired to implement a data processing technique that is not restricted to piecewise constant formations and does not require prior knowledge of dip angles. Thus, there remains a need for a simplified process and apparatus that produces accurate conductivity profiles of unrestricted formations from data developed by a well tool.

SUMMARY OF THE INVENTION

A method and system are provided for producing a conductivity log unaffected by shoulder effect and dip from voltage data developed by a well tool when the tool is disposed in a borehole traversing a formation. The tool including a transmitter T1 and a plurality of receiver pairs Rn (n>0).

In a first aspect of the invention, the voltage data developed by the well tool is accessed and boosted. Two-coil voltages are then reconstructed from the boosted voltage data. The reconstructed two-coil voltages are then processed and the conductivity log is produced from the processed two-coil voltages.

In a second aspect of the invention, a specific coil configuration is synthesized from the tool voltage data to provide a mutual balance condition to produce a formation conductivity log.

In a third aspect of the invention, a logging system is provided, including an well tool and an apparatus coupled to the tool where the apparatus is adapted to respond to voltage data developed by the receiver pairs Rn, for producing a conductivity log and recording the log on an output record medium.

BRIEF DESCRIPTION OF THE DRAWINGS

Other aspects and advantages of the invention will become apparent upon reading the following detailed description and upon reference to the drawings in which.

DETAILED DESCRIPTION OF SPECIFIC EMBODIMENTS

In the interest of clarity, not all features of actual implementation are described in this specification. It will be appreciated that although the development of any such actual implementation might be complex and time-consuming, it would nevertheless be a routine undertaking for those of ordinary skill in the art having the benefit of this disclosure.

Overview of the Problem

Figure 1:
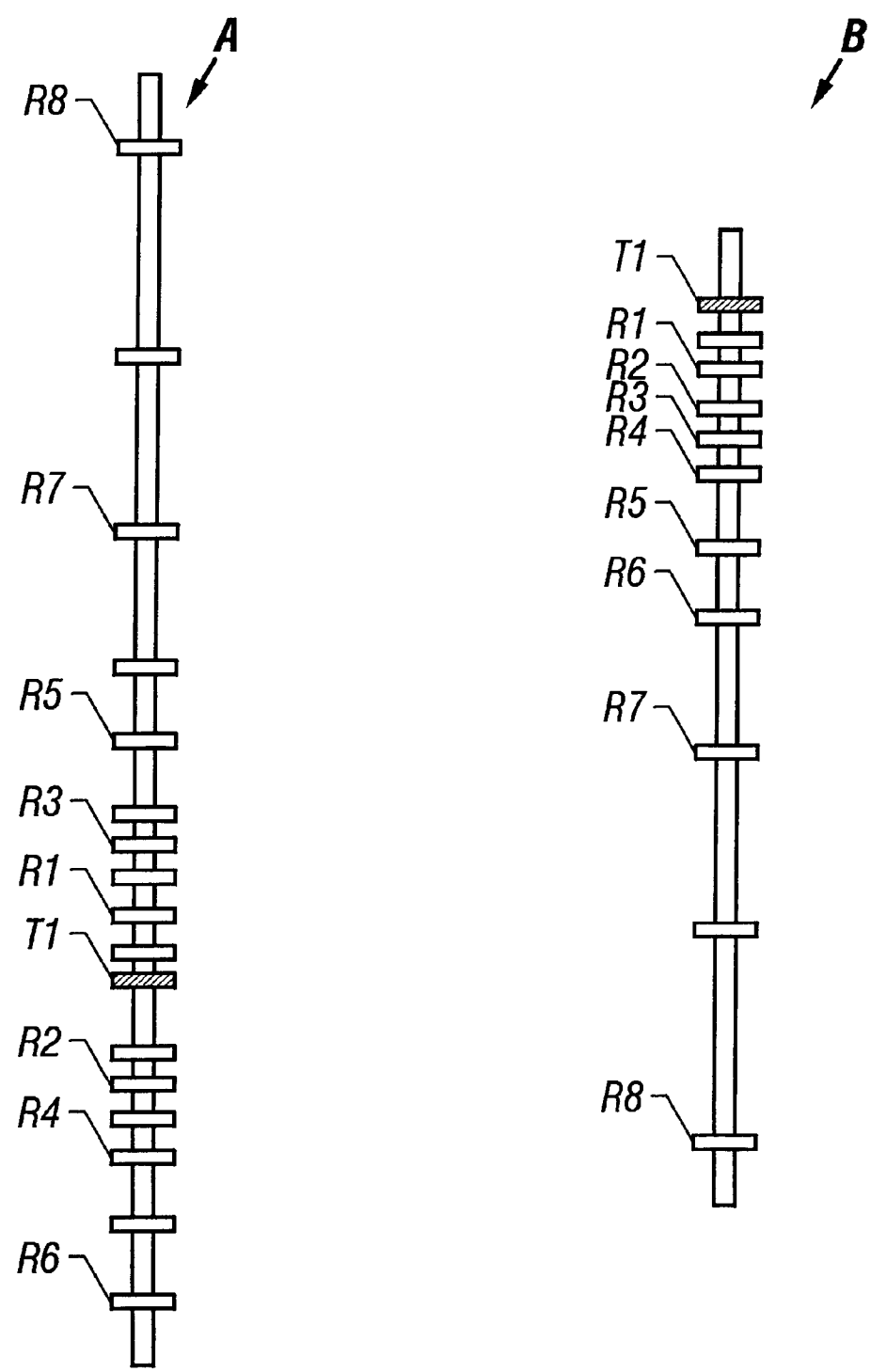
FIG. 1 is a schematic of two well tool designs for implementation of the present invention.

FIG. 1 shows the coil layouts of two induction array well tool designs A, B (disclosed in the '605 patent) which may be used to implement the present invention. Each design includes a transmitter T1 and a plurality of receiver pairs Rn (n>0). As discussed above, energy transmitted into a formation propagates in the formation and is detected by a receiver pair Rn as a complex-valued phasor voltage (not shown). Several processing steps are applied to the receiver voltage data to obtain estimates of the formation conductivity as described by J. F. Hunka et al., *A New Resistivity Measurement System for Deep Formation Imaging and High-Resolution Formation Evaluation,* Paper SPE 20559, 1990 SPE TECHNICAL CONFERENCE AND EXHIBITION, September, 1990. After applying borehole corrections and skin effect corrections, a multi-channel deconvolution technique is used to produce conductivity logs with matched vertical resolution and different depths of investigation.

Figure 2:
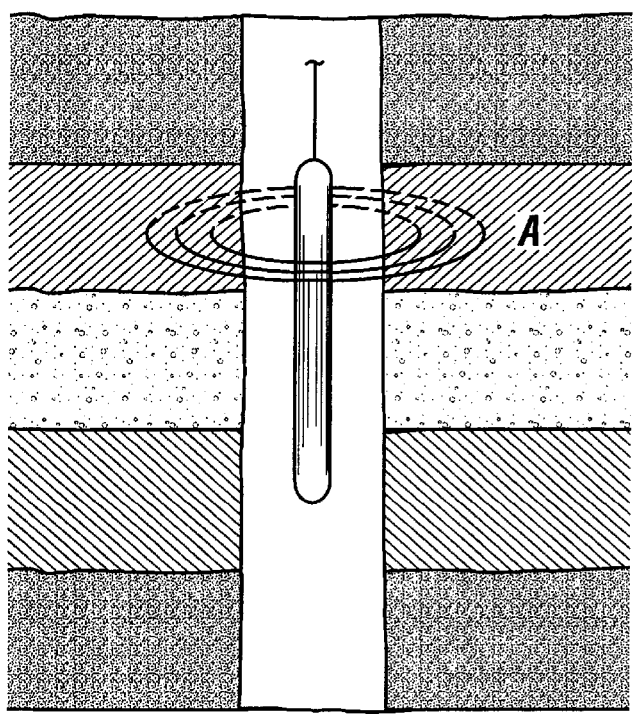
FIG. 2 shows measurements obtained with a well tool disposed in a vertical well with uniform bedding planes.
Figure 3:
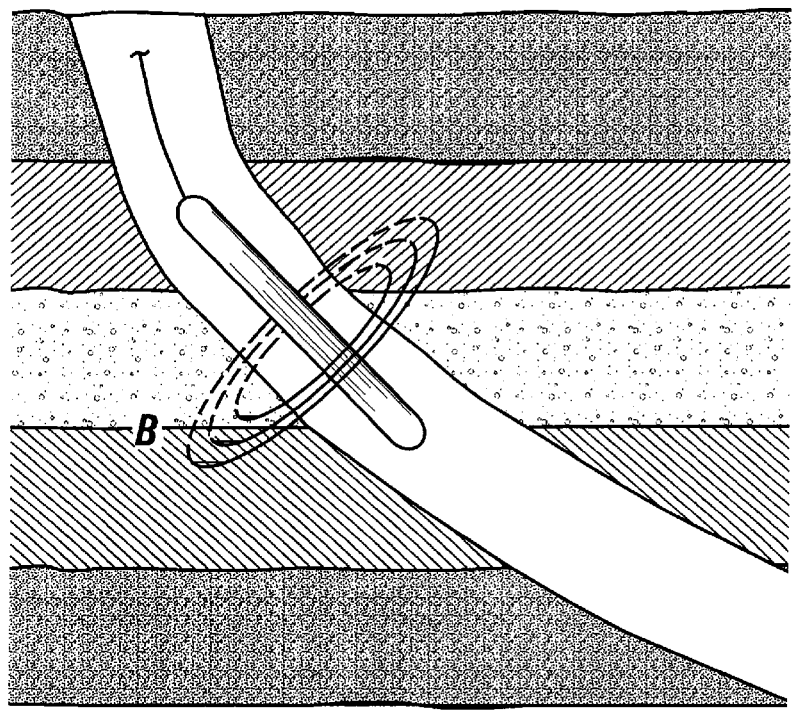
FIG. 3 shows measurements obtained with a well tool disposed in a deviated borehole, or when the formation beds dip with respect to the borehole.

As discussed above, these processing techniques often produce incorrect estimations in the presence of dip or high-contrast thin layers. FIG. 2 shows qualitatively the focused range of investigation obtained with a well logging tool 10 disposed in a vertical well with uniform bedding planes. As seen in FIG. 2, the focused tool response is concentrated within a plane layer (A). FIG. 3 shows the response when the tool 10 is disposed in a deviated borehole, or when the formation beds dip with respect to the borehole. As seen in FIG. 3, the response range crosses the bedding planes to include adjacent layers (B), resulting in a corrupted measurement. In resistive beds, the logs are strongly influenced by the presence of conductive neighboring beds.

Difference Processing Method

Figure 4:
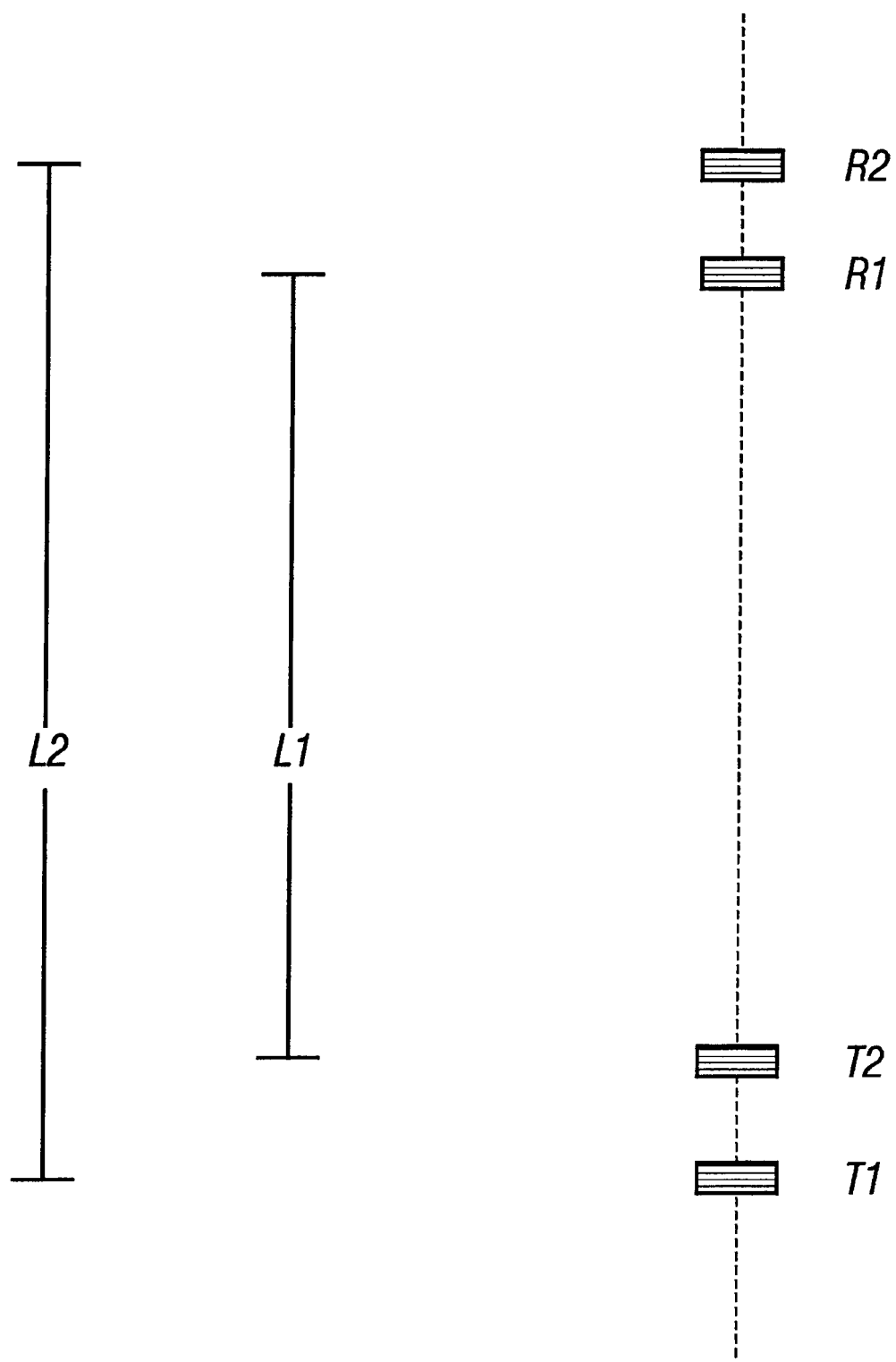
FIG. 4 is a schematic diagram of a basic dip-corrected measurement in accordance with the present invention.

The approach of the present invention is based on a simple property of two-coil EM measurements. FIG. 4 shows a conceptual measurement with two identical transmitter coils T1, T2 and two identical receiver coils R1, R2. $L_1$ is the separation between transmitter T2 and receiver R1; $L_2$ is the separation between transmitter T1 and receiver R2. $L_1$ and $L_2$ differ by a small amount. The transmitters are activated one at a time. Let $V_{21}$ be the voltage measured on receiver R2 when transmitter T1 is active, and $V_{12}$ be the voltage measured on receiver R1 when transmitter T2 is active (not shown). If all the coils are in a sufficiently thick uniform layer, the voltage difference $D=V_{21}-V_{12}$ will be independent of the tool position. If the layer is sufficiently thick, the voltage difference D will have the same value as in an infinite uniform medium. The voltage difference D will be unaffected by neighboring layers, and unaffected by dip. This property of two-coil measurements is derived mathematically in the following section. The formation conductivity may be estimated by comparing the measured data for D against values (obtained from theoretical modeling) that would be obtained in an infinite uniform medium.

As seen in FIG. 1, the well tool A, B has eight arrays with two receiver coils Rn each. The arrays share a common transmitter coil T1. The receiver coils Rn are connected in series in pairs. The number of turns on the receiver coils is chosen to produce a mutual balance condition (zero signal in air). Because the receiver coils Rn have unequal turns, the difference processing method (based on the difference D) cannot be applied directly. However, in tool designs A and B, the main receiver coil Rn for each array is approximately at the same distance to the transmitter T1 as the bucking coil of the next array, as seen in FIG. 1 and described in the '605 patent. This overlap in coil separations makes it possible to reconstruct two-coil voltages. By interpolating and differentiating the reconstructed two-coil voltage data, a good approximation to difference processing can be obtained.

Two-Coil Response

Analysis of the present invention begins with the solution for the response of a two-coil (one transmitter, one receiver) tool or sonde. [In the present disclosure, any references to coils are intended to generally mean solenoid coils, of the type used as transmitters and receivers in conventional induction and propagation well tools.] The effects of the tool and borehole are neglected; the coils are approximated as point magnetic dipoles. The transmitter carries unit current (one ampere).

For a two-coil sonde, the transfer impedance $Z_{RT}$ is defined as the receiver voltage divided by the transmitter current. $Z_{RT}$ is expressed as $$Z_{RT} = -\frac{ik_0 Z_0}{2\pi} s_R s_T \int_0^\infty \left\{ \cos^2\alpha\, q^3 J_0(q\rho) \gamma^h(z_R, z_T) + \right. \tag{1}$$
$$\sin\alpha\cos\alpha\, q^2 J_1(q\rho)\left(\frac{\partial}{\partial z_T}\gamma^h(z_R, z_T) - \frac{\partial}{\partial z_R}\gamma^h(z_R, z_T)\right) +$$
$$\sin^2\alpha\, q J_1'(q\rho)\left(\frac{\partial}{\partial z_R}\frac{\partial}{\partial z_T}\gamma^h(z_R, z_T)\right) +$$
$$\left. k_0^2 \sin^2\alpha\, \frac{1}{\rho} J_1(q\rho) \mu_r(z_R)\mu_r(z_T)\gamma^e(z_R, z_T) \right\} dq.$$

Here $s_T$ is the transmitter dipole strength (number of turns× area); $s_R$ is the receiver dipole strength. $z_T$ and $z_R$ denote the respective vertical position (formation depth) of the transmitter and receiver coils, p is the horizontal separation. The dip angle $\alpha$ is assumed to be constant. $J_0$, and $J_1$ are Bessel functions of order zero and unity; $J_1'$ is the derivative of $J_1$.

The electrical parameters of the medium are represented by $$k_0 = \omega\sqrt{\mu_0\varepsilon_0}, \quad \varepsilon_r = \frac{\varepsilon}{\varepsilon_0} + \frac{i\sigma}{\omega\varepsilon_0}, \quad \mu_r = \frac{\mu}{\mu_0}, \tag{2}$$

where $\epsilon, \mu$ and $\sigma$ respectively represent permittivity, permeability, and conductivity. $\omega$ is the angular frequency. The zero subscripts on $\epsilon$ and $\mu$ denote free-space values. $Z_0 = \sqrt{\mu_0/\epsilon_0} = 376.7$ ohms is the impedance of free space.

To construct the Green's functions $\gamma$, consider first solutions of the homogeneous one-dimensional equations $$\frac{d}{dz}\frac{1}{\varepsilon_r}\frac{d}{dz}\psi^e + \left(k_0^2\mu_r - \frac{q^2}{\varepsilon_r}\right)\psi^e = 0, \tag{3}$$
$$\frac{d}{dz}\frac{1}{\mu_r}\frac{d}{dz}\psi^h + \left(k_0^2\varepsilon_r - \frac{q^2}{\mu_r}\right)\psi^h = 0.$$

Let $\Psi^{e-}$, $\Psi^{h-}$ be solutions that are regular at $z=-\infty$ and $\Psi^{e+}$, $\Psi^{h+}$ solutions that are regular at $z=+\infty$. From these solutions one can construct Green's functions by Lagrange's method. The Green's functions $\gamma$ are solutions of the equations $$\frac{d}{dz}\frac{1}{\varepsilon_r}\frac{d}{dz}\gamma^e(z, z') + \left(k_0^2\mu_r - \frac{q^2}{\varepsilon_r}\right)\gamma^e(z, z') = \delta(z - z'), \tag{4}$$
$$\frac{d}{dz}\frac{1}{\mu_r}\frac{d}{dz}\gamma^h(z, z') + \left(k_0^2\varepsilon_r - \frac{q^2}{\mu_r}\right)\gamma^h(z, z') = \delta(z - z').$$

They can be computed from the expressions $$\gamma^e(z, z') = \frac{\psi^{e-}(z_<)\psi^{e+}(z_>)}{W^e}, \tag{5}$$
$$\gamma^h(z, z') = \frac{\psi^{h-}(z_<)\psi^{h+}(z_>)}{W^h},$$

where $z_< = \min(z, z')$, and $z_> = \max(z, z')$. The Wronskians $W^e$, $W^h$, defined by $$W^e = \frac{1}{\varepsilon_r}\left[\psi^{e-}(z)\frac{d}{dz}\psi^{e+}(z) - \psi^{e+}(z)\frac{d}{dz}\psi^{e-}(z)\right], \tag{6}$$

$$W^h = \frac{1}{\mu_r}\left[\psi^{h-}(z)\frac{d}{dz}\psi^{h+}(z) - \psi^{h+}(z)\frac{d}{dz}\psi^{h-}(z)\right],$$

are independent of z.

When the dip angle $\alpha$ is larger than about 45 degrees, the convergence of the integral is slow, and it is then advantageous to use contour integration in the complex plane of q. By using the identities $$J_0(x) = \frac{1}{2}[H_0^{(1)}(x) - H_0^{(1)}(xe^{i\pi})], \tag{7}$$
$$J_1(x) = \frac{1}{2}[H_1^{(1)}(x) - H_1^{(1)}(xe^{i\pi})],$$

equation (1) can be written as a contour integral, where the path of integration C must lie above the origin and below the singularities of $\gamma^e$ and $\gamma^h$:

$$Z_{RT} = -\frac{ik_0 Z_0}{4\pi} s_R s_T \int_C \left\{ \cos^2\alpha\, q^3 H_0^{(1)}(q\rho)\gamma^h(z_R, z_T) + \right. \tag{8}$$
$$\sin\alpha\cos\alpha\, q^2 H_1^{(1)}(q\rho)\left(\frac{\partial}{\partial z_T}\gamma^h(z_R, z_T) - \frac{\partial}{\partial z_R}\gamma^h(z_R, z_T)\right) +$$
$$\sin^2\alpha\, q H_1^{(1)}(q\rho)\left(\frac{\partial}{\partial z_R}\frac{\partial}{\partial z_T}\gamma^h(z_R, z_T)\right) +$$
$$\left. k_0^2\sin^2\alpha\, \frac{1}{\rho} H_1^{(1)}(q\rho)\mu_r(z_R)\mu_r(z_T)\gamma^e(z_R, z_T) \right\} dq.$$

Equation (5) shows that the Green's functions $\gamma$ are symmetric:

$$\gamma^e(z_R, z_T) = \gamma^e(z_T, z_R), \quad \gamma^h(z_R, z_T) = \gamma^h(z_T, z_R). \tag{9}$$

From equation (4), it is seen that $\gamma^e$ and $\gamma^h$ satisfy the following partial differential equations:

$$\left(\varepsilon_r(z_R)\frac{\partial}{\partial z_R}\frac{1}{\varepsilon_r(z_R)}\frac{\partial}{\partial z_R} - \varepsilon_r(z_T)\frac{\partial}{\partial z_T}\frac{1}{\varepsilon_r(z_T)}\frac{\partial}{\partial z_T}\right)\gamma^e(z_R, z_T) = \tag{10}$$
$$-k_0^2(\mu_r(z_R)\varepsilon_r(z_R) - \mu_r(z_T)\varepsilon_r(z_T))\gamma^e(z_R, z_T),$$
$$\left(\mu_r(z_R)\frac{\partial}{\partial z_R}\frac{1}{\mu_r(z_R)}\frac{\partial}{\partial z_R} - \mu_r(z_T)\frac{\partial}{\partial z_T}\frac{1}{\mu_r(z_T)}\frac{\partial}{\partial z_T}\right)\gamma^h(z_R, z_T) =$$
$$-k_0^2(\varepsilon_r(z_R)\mu_r(z_R) - \varepsilon_r(z_T)\mu_r(z_T))\gamma^h(z_R, z_T).$$

If the transmitter and receiver coils are both in a uniform layer with no z variation, one simply gets $$\left(\frac{\partial^2}{\partial z_R^2} - \frac{\partial^2}{\partial z_T^2}\right)\gamma^e(z_R, z_T) = 0, \tag{11}$$
$$\left(\frac{\partial^2}{\partial z_R^2} - \frac{\partial^2}{\partial z_T^2}\right)\gamma^h(z_R, z_T) = 0.$$

The partial derivatives can be factored as $$\left(\frac{\partial}{\partial z_R} + \frac{\partial}{\partial z_T}\right)\left(\frac{\partial}{\partial z_R} - \frac{\partial}{\partial z_T}\right)\gamma^e(z_R, z_T) = 0, \tag{12}$$
$$\left(\frac{\partial}{\partial z_R} + \frac{\partial}{\partial z_T}\right)\left(\frac{\partial}{\partial z_R} - \frac{\partial}{\partial z_T}\right)\gamma^h(z_R, z_T) = 0.$$

The desired result is that $$\left(\frac{\partial}{\partial z_R} - \frac{\partial}{\partial z_T}\right)\gamma^e(z_R, z_T) = C^e, \quad (13)$$

$$\left(\frac{\partial}{\partial z_R} - \frac{\partial}{\partial z_T}\right)\gamma^h(z_R, z_T) = C^h,$$

where $C^e$ and $C^h$ are independent of $(z_R+z_T)/2$, i.e., independent of the tool position. In a sufficiently thick layer, $C^e$ and $C^h$ will have the same values as in an infinite uniform medium.

In a uniform layer, these quantities can be evaluated analytically. Suppose that the electrical parameters $\epsilon_r, \mu_r$ are independent of z in an interval $z_L < z_T < z_R < z_H$. The solutions $\Psi^-$, $\Psi^+$, from equation (3), have the form $$\Psi^- = A^-(e^{\beta z} + R^- e^{-\beta(z-2z_L)}),$$

$$\Psi^+ = A^+(e^{-\beta z} + R^+ e^{\beta(z-2z_H)}), \quad (14)$$

where $$\beta = \sqrt{q^2 - k_0^2 \epsilon_r \mu_r}. \quad (15)$$

The branch of the square root that makes real $(\beta) \geq 0$ should be chosen. Equation (5) gives $$\left(\frac{\partial}{\partial z_R} - \frac{\partial}{\partial z_T}\right)\gamma^e(z_R, z_T) = \epsilon_r e^{-\beta(z_R-z_T)} \frac{1 - R^- R^+ e^{-2\beta(z_H-z_L-z_R+z_T)}}{1 - R^- R^+ e^{-2\beta(z_H-z_L)}}, \quad (16)$$

and a similar expression for $\gamma^h$. If $R^-=0$ or $R^+=0$, we get the same result as in an infinite uniform medium. In particular, a semi-infinite uniform layer gives the same result as the infinite uniform medium. The first order terms in the reflection coefficients $R^-$, $R^+$ cancel; only the product $R^-R^+$ survives. Generally, the magnitude of reflection coefficients is smaller than unity. The exponential factor provides further attenuation since real $(\beta) \geq 0$. Thus one can expect that, in a thick layer, $$|R^- R^+ e^{-2\beta(z_H-z_L)}| < |R^- R^+ e^{-2\beta(z_H-z_L-z_R+z_T)}| \ll 1, \quad (17)$$

giving approximately the same result as an infinite uniform medium. It is seen that the partial derivatives in equation (13) suppress reflected waves to first order, which leads to reduced shoulder effect in the estimated conductivity.

These relations are now expressed in terms of the log depth h (measured along the borehole):

$$z_R = h_R \cos\alpha,$$

$$z_T = h_T \cos\alpha, \quad (18)$$

$$\left(\frac{\partial}{\partial h_R} - \frac{\partial}{\partial h_T}\right)\gamma^e(z_R, z_T) = C^e \cos\alpha, \quad (19)$$

$$\left(\frac{\partial}{\partial h_R} - \frac{\partial}{\partial h_T}\right)\gamma^h(z_R, z_T) = C^h \cos\alpha.$$

The horizontal separation $\rho$ can be expressed as $\rho = |h_R - h_T|\sin\alpha$. For any function of $\rho$, $$\left(\frac{\partial}{\partial h_R} - \frac{\partial}{\partial h_T}\right)J(q\rho) = 2\,\text{sign}(h_R - h_T)\sin\alpha \frac{\partial}{\partial \rho} J(q\rho) \quad (20)$$

is independent of the tool log depth $(h_R+h_T)/2$. This information allows one to conclude that, if the transmitter and receiver coils are in a uniform layer, $$\left(\frac{\partial}{\partial h_R} - \frac{\partial}{\partial h_T}\right)Z_{RT} = \text{constant} \quad (21)$$

will be independent of the tool position. Differentiation under the integral signs in equation (1) or (8) is permissible because the integrand has the necessary smoothness and convergence properties. The constant in equation (21) will be the same as in an infinite uniform medium provided the layer is sufficiently thick.

Inferences from the Analysis

Certain inferences can be drawn from the analysis. The partial derivative in equation (21) can be approximated by a finite difference, varying the separation between the transmitter and receiver in a two-coil sonde. Let $\upsilon(h_R, h_T)$ denote the phasor voltage measured at the receiver coil of the two-coil sonde, where $h_R$, $h_T$ are the positions of the two coils measured downward along the tool axis. If the transmitter current is I amperes, we have, from equation (1), $$\upsilon(h_R, h_T) = I\, Z_{RT}(h_R, h_T). \quad (22)$$

If the transmitter and receiver coils are in a uniform layer, then, according to equation $$\left(\frac{\partial}{\partial h_R} - \frac{\partial}{\partial h_T}\right)\upsilon(h_R, h_T) = \text{constant.} \quad (23)$$

where the constant is independent of $h_R+h_T$. In a thick layer, the constant has the same value as for an infinite homogeneous medium.

Reference is made again to FIG. 4, which shows a conceptual measurement to exploit this relationship. The separation L between the transmitter T1 and receiver coils R1, R2 (dashed lines represent the tool axis) is varied by a small amount, while the midpoint between the transmitter coil T1 and receiver coils R1, R2 is held fixed. Equation (23) shows that the difference in the measured voltage is independent of position if all the coils are in a uniform layer. In a thick bed, the voltage difference is not affected by the shoulder beds, even in the presence of dip.

The same analysis can be extended to an anisotropic layered formation that is transversely isotropic. It is also applicable to measurements with transmitter or receiver coils that are tilted relative to the tool's longitudinal axis. Also noteworthy is the fact that the dip angle is not required to apply this method. Borehole effects will have more impact on the disclosed techniques as compared to conventional processing, but are still correctable.

Tool Sensitivity Factor

In order to reconstruct the two-coil response from the voltage data obtained from the well tool, the fact that the receiver pairs Rn of the tool have unequal coil turns must be taken into account. Considering the response of a well tool in an infinite homogeneous isotropic medium, the receiver voltage V can be expressed as $$V = \frac{i\omega\mu}{2\pi}\sum_r\sum_t IN_r A_r N_t A_t e^{ik|h_r-h_t|}(1 - ik|h_r - h_t|)|h_r - h_t|^{-3}. \quad (24)$$

Here $N_r$ is the number of turns in a receiver coil, $A_r$ is the effective area of the coil, and I is the transmitter current. Denote the respective positions of the tool transmitter and receiver coils along the tool axis by $h_r$, $h_t$. The propagation coefficient k can be computed from $$k=\sqrt{\epsilon\mu\omega^2+i\omega\mu\sigma}, \text{ real } (k) \geq 0. \tag{25}$$

Here $\omega$ is the angular frequency; $\epsilon$, $\mu$ and $\sigma$ respectively represent permittivity, permeability, and conductivity of the medium.

As described in the '605 patent, the signal developed for each channel j (originating from receiver pair Rn) of the tool is a complex-valued apparent conductivity $\sigma^j_{AIT}$ proportional to the receiver voltage $V^j$, i.e., $\sigma^j_{AIT}=V^j/K_j$. The sensitivity factor K is obtained from the behavior of V at low conductivity, $\sigma \approx 0$:

$$V \approx \frac{i\omega\mu}{2\pi}\sum_t\sum_r IN_rA_rN_tA_t|h_r-h_t|^{-3} - \tag{26}$$

$$\sigma\sum_t\sum_r \frac{i\omega\mu}{4\pi}IN_rA_rN_tA_t|h_r-h_t|^{-1}.$$

To achieve mutual balance, the coil turns are chosen so that $$\sum_t\sum_r N_rA_rN_tA_t|h_r-h_t|^{-3} = 0, \tag{27}$$

leaving $$V \approx K\sigma,$$

where $$K = -\sum_t\sum_r \frac{\omega^2\mu^2}{4\pi}IN_rA_rN_tA_t|h_r-h_t|^{-1}. \tag{28}$$

For the well tool designs A, B of FIG. 1, this expression simplifies because there is only one transmitter coil T1. The effective area $A_r$ is also the same for all the receiver coils Rn. To reconstruct two-coil responses from the tool voltage data, $N_r$ and $|h_r-h_t|$ need to be taken into account.

Implementation

Processing of the well tool voltage data begins with accessing the data from the tool in the manner described in the '605 patent. In tool design A, some of the arrays operate at two frequencies. The channel number j (not shown) identifies the receiver pair Rn and frequency of the voltage datum. The voltage data for each channel are then transmitted to the surface to be stored and processed as described below.

Boosting

A preliminary estimation of the formation conductivity may be derived at this point by boosting the voltage data. Boosting refers to homogeneous medium inversion. Theoretically, homogeneous medium inversion should be the last processing step. However, since the non-linearity of the data is mild, it is more convenient to apply this correction first.

The homogeneous medium conductivity $\sigma_b$ may be determined in different ways. One way is by using a weighted least squares criterion, for example, one can minimize $$\epsilon^j=w[\text{real}(V^j_{homog}(\sigma_b)-V^j_{meas})]^2+(1-w)[\text{imag}(V^j_{homog}(\sigma_b)-V^j_{meas})]^2, \tag{29}$$

where the infinite homogeneous voltage $V^j_{homog}$ is computed using equation (24). $V^j_{meas}$ denotes the measured tool voltage data value for channel j. The constant weight w, $0\leq w\leq 1$, can be adjusted to give more or less emphasis to the real part of $V^j_{meas}$. For low-conductivity formations, the stored voltage data may be boosted by deriving the following formula:

$$\sigma_b \approx \frac{1}{K_j}(\text{real } V^j_{meas} + \text{imag } V^j_{meas}). \tag{30}$$

Another boosting technique may be implemented by establishing a table of voltage data values associated with formation conductivity (based on theoretical modeling) and looking up the tool voltage data values within the table to reference a conductivity value.

Reconstructing Two-Coil Voltages

To reconstruct two-coil voltages $\upsilon^j$ from well tool voltages $V_j$, one first computes tool voltages from the boosted apparent conductivity $\sigma^j_{AIT}$ recorded for each channel j:

$$V^j=K_j\sigma^j_{AIT}, \tag{31}$$

here $K_j$ is the channel j sensitivity factor.

The relation between the tool voltage $V_j$ and the two-coil voltage $\upsilon^j$ is $$N_2^j\upsilon^j+N_1^j\upsilon^{j-1}=V^j, \tag{32}$$

where $N_1^j$, $N_2^j$ represent the number of turns of the first and second receiver coils of the receiver pair Rn at channel j.

This relation allows one to solve for the two-coil voltage $\upsilon^j$ recursively:

$$\upsilon^j=(V^j-N_1^j\upsilon^{j-1})/N_2^j. \tag{33}$$

An estimate of the first two-coil voltage $\upsilon^1$ is needed to start the recursion in equation (33). One useful estimation formula assumes that $$\upsilon^1/\kappa_1=\upsilon^2/\kappa_2 \tag{34}$$

where $\kappa$ is the two-coil sensitivity factor.

Processing Reconstructed Voltages

The two-coil voltage $\upsilon$ can then be computed for arbitrary two-coil spacings $q=h_R-h_T$ by interpolating $\upsilon$ from the tabulated values obtained with equation (33). Linear or spline interpolation may be used for the interpolation. From the interpolated values of $\upsilon$, one can then evaluate an estimator $\sigma^j_{Grim}$ of the formation conductivity, $$\sigma^j_{Grim} = \frac{1}{k_j}\frac{\Delta\upsilon^j}{\Delta q_j}, \tag{35}$$

where $\Delta q_j$ is the increment in the receiver-to-transmitter spacing for channel j, and $k_j$ is the sensitivity factor for $\Delta\upsilon^j/\Delta q_j$.

An alternative approach to selecting the first two-coil voltage $\upsilon^1$ for the recursion in equation (33) can be formulated in terms of $\sigma^j_{Grim}$:

$$\sigma_{Grim}^1=\sigma_{Grim}^2. \tag{36}$$

The end product of these processing steps is a set of seven conductivity curves representing measurements of the type shown in FIG. 4, with the spacings $L_1$, $L_2$ listed

TABLE 1

| Channel | Short Spacing $L_1$ (inches) | Long Spacing $L_2$ (inches) |
| --- | --- | --- |
| 9 | 6 | 9 |
| 12 | 9 | 12 |
| 15 | 12 | 15 |
| 21 | 18 | 21 |
| 27 | 24 | 27 |
| 39 | 36 | 39 |
| 54 | 51 | 54 |
| 72 | 69 | 72 |

With this spacings, $\Delta q_j=3$ inches for all the channels j, which gives approximately matched vertical resolution.
Once derived, the conductivity estimators $\sigma_{Grim}{}^j$ may be stored and recorded on a suitable output record medium to produce a conductivity log as known in the art.
As noted above, the dip angle is not required to apply this method.

Data Shifting

The derivative $\Delta v^j / \Delta_j$ must be evaluated with $h_R + h_T$ held constant. Therefore, depth shifts of the tabular boosted tool voltage data must be performed before and after reconstruction of the two-coil voltages $v^j$ of equation (33). The depth shifts performed before and after reconstruction are hereafter respectively referred to as forward and backward shifting. By shifting the tool voltage data, the midpoint between the receivers Rn and the transmitter T1 is kept fixed as defined by the voltage data. These depth shifts are measured in units of inches for convenience.

Figure 5:
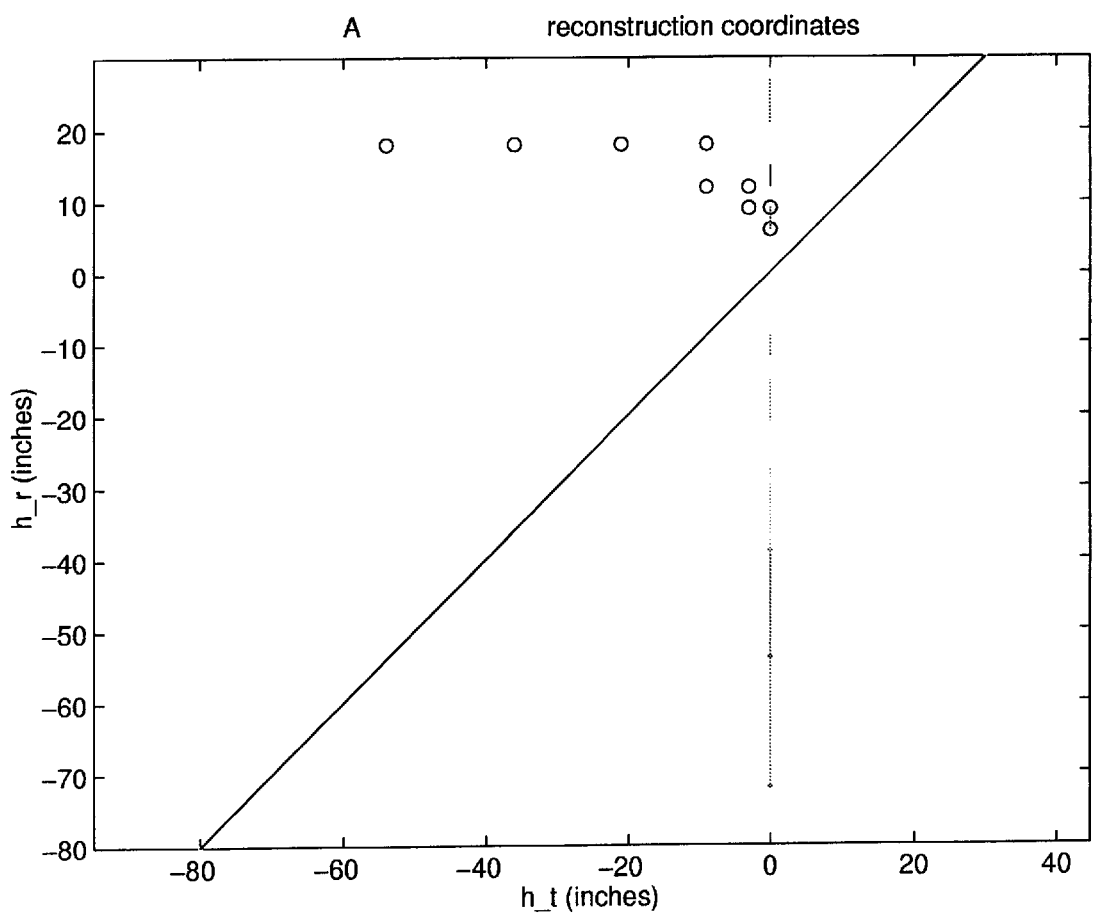
FIG. 5 illustrates graphically a sequence of points where two-coil voltage data can be reconstructed in accordance with the present invention.
Figure 6:
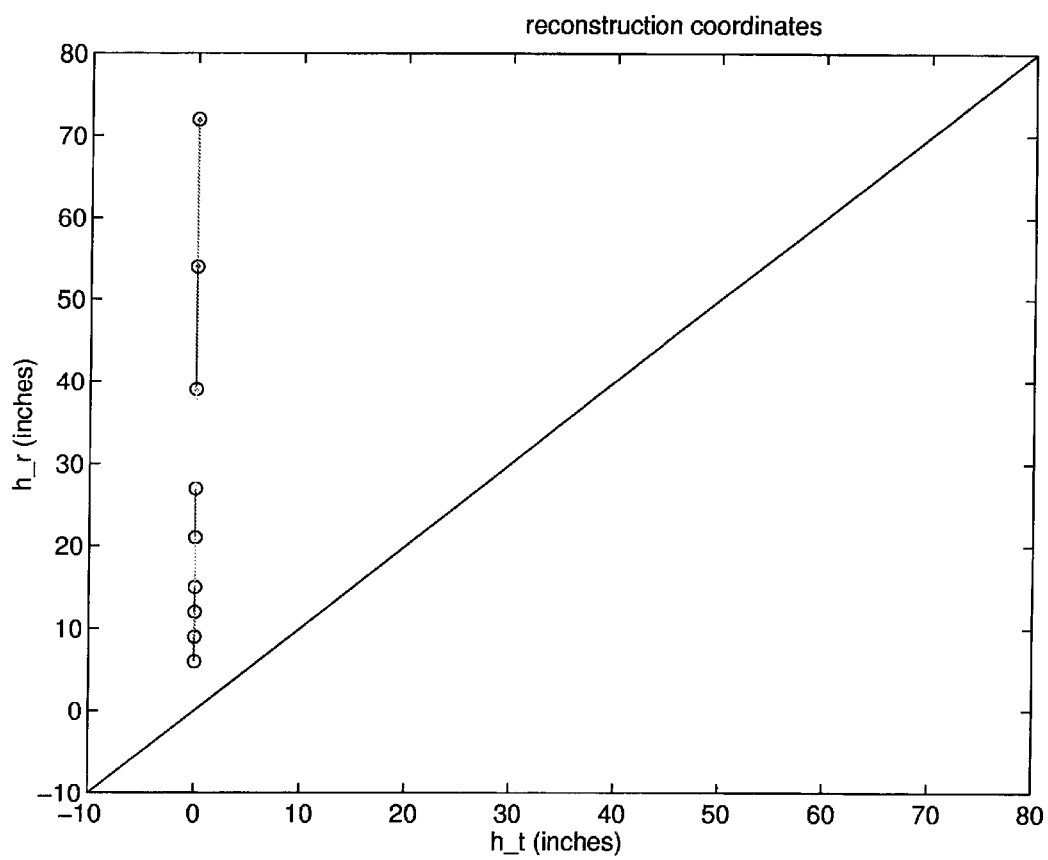
FIG. 6 illustrates graphically a sequence of points where two-coil voltage data can be reconstructed in accordance with the present invention.

FIGS. 5 and 6 show the sequence of points in the $h_t$–$h_r$ plane where the two-coil voltage $v^j$ can be reconstructed, for the tool designs A, B of FIG. 1, by applying equation (33). The line segments represent the measured tool voltage data. The reciprocity property of equation (22) is used to reconstruct $v$ at the small circles in FIG. 5 for the tool design A. The necessary forward and backward shifts of the tabular data are given in Table 2. As known in the art, a decrease in depth within a borehole is given a negative sign.

TABLE 2

| Channel | TOOL-A Forward | Shifts (inches) Backward | TOOL-B Forward | Shifts (inches) Backward |
| --- | --- | --- | --- | --- |
| 9 | 0 | 4.5 | 0 | 4.5 |
| 12 | −9 | 3.0 | 0 | 6.0 |
| 15 | 3 | 4.5 | 0 | 7.5 |
| 21 | −12 | 1.5 | 0 | 10.5 |
| 27 | 9 | 4.5 | 0 | 13.5 |
| 39 | −18 | −1.5 | 0 | 19.5 |
| 54 | −18 | −9.0 | 0 | 27.0 |
| 72 | −18 | −18.0 | 0 | 36.0 |

As shown in Table 2, no forward shifting of the data is needed for the tool design B because the receiver pairs Rn are all below the transmitter T1. At high dip angle (above 60 degrees), these shifts become unimportant and may be omitted.

Mutual Balance Condition

Figure 7:
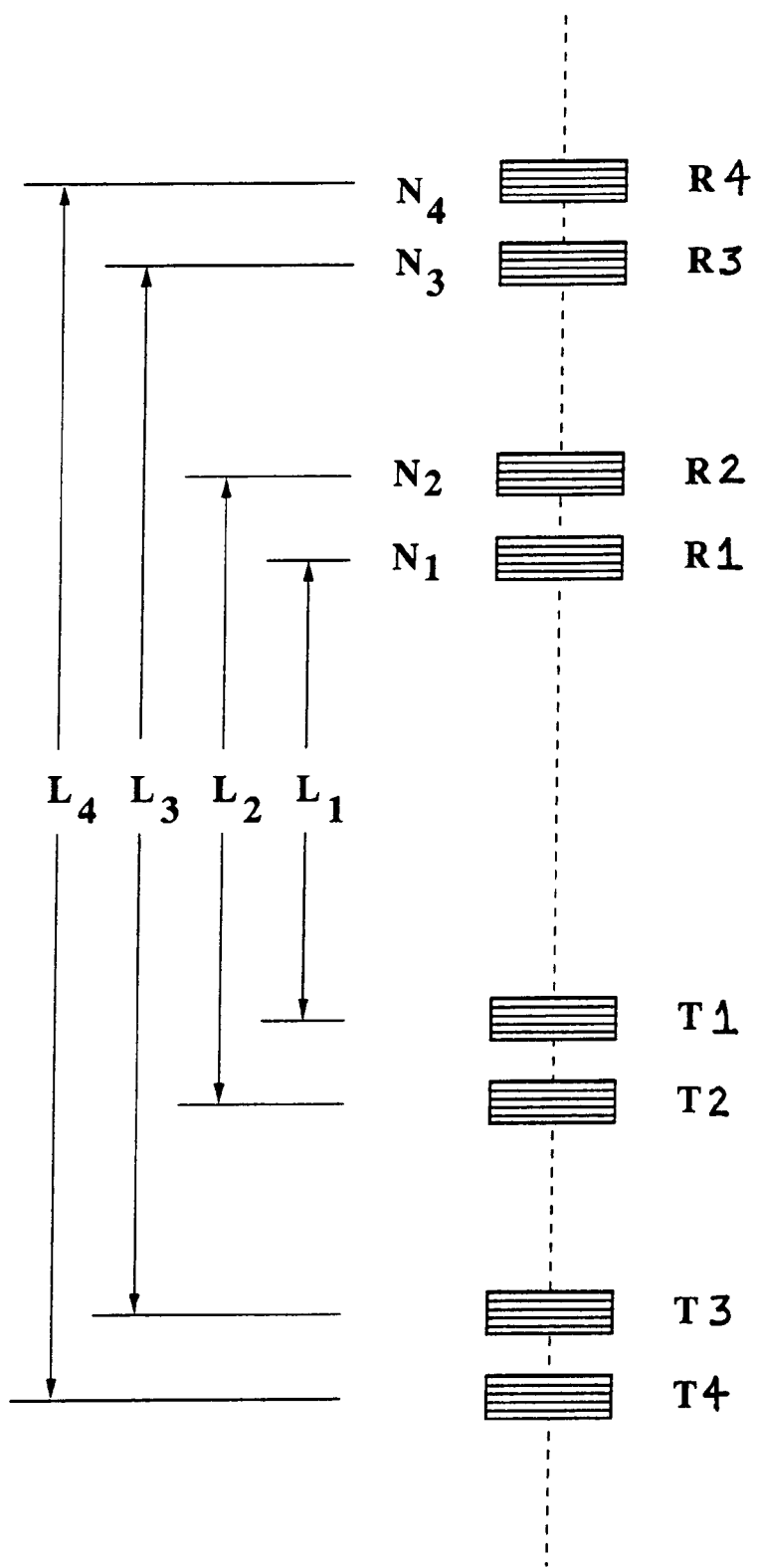
FIG. 7 is another schematic diagram of a mutual-balanced dip-corrected measurement in accordance with the present invention.

FIG. 7 illustrates an alternative coil configuration that can be synthesized from the tool voltage data. After computing and storing the estimators $\sigma_{Grim}{}^j$ for each channel j, they are combined in pairs (using different spacings $q_j$ with suitable weights) to achieve mutual balance. Once derived, the combined conductivity estimator $\sigma_{Grim}{}^j$ may be stored and recorded on a suitable output record medium to produce a conductivity log as known in the art.

Transmitters T1–T4 have the same number of coil turns. The receiver coil Rn turns N are equal and opposite for each synthesized pair:

$$N_2 = -N_1, \, N_4 = -N_3. \tag{37}$$

The mutual balance condition, equation (27), gives $$\frac{N_3}{N_1} = -\frac{L_1^{-3} - L_2^{-3}}{L_3^{-3} - L_4^{-3}}. \tag{38}$$

The mutual balance condition produces zero signal in air, canceling the primary field as known in the art. This configuration provides an improved response in the radial direction (perpendicular to the tool axis), but a caveat is that it also increases the noise amplification factor.

Figure 8:
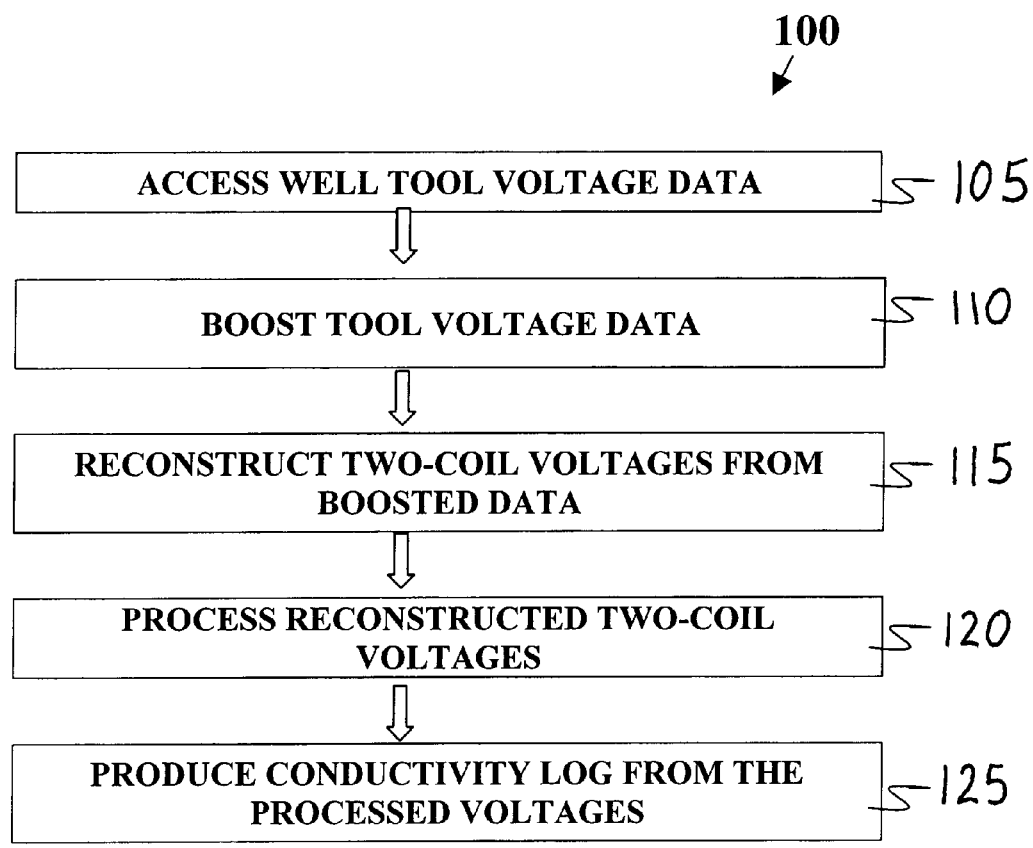
FIG. 8 illustrates a flow diagram of a method for implementation of the present invention.

FIG. 8 illustrates a flow diagram of a method 100 for producing a conductivity log from voltage data developed by the tool when the is disposed in a borehole traversing a formation. The method comprises accessing the voltage data developed by the tool 105; boosting the voltage data 110; reconstructing two-coil voltages from the boosted voltage data 115; processing the reconstructed two-coil voltages 120; and producing the conductivity log from the processed two-coil voltages 125.

Program Storage Device

It will be apparent to those of ordinary skill having the benefit of this disclosure that the present invention may be implemented by programming one or more suitable general-purpose computers having appropriate hardware. The programming may be accomplished through the use of one or more program storage devices readable by the computer processor and encoding one or more programs of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions is immaterial here.

Logging System

Figure 9:
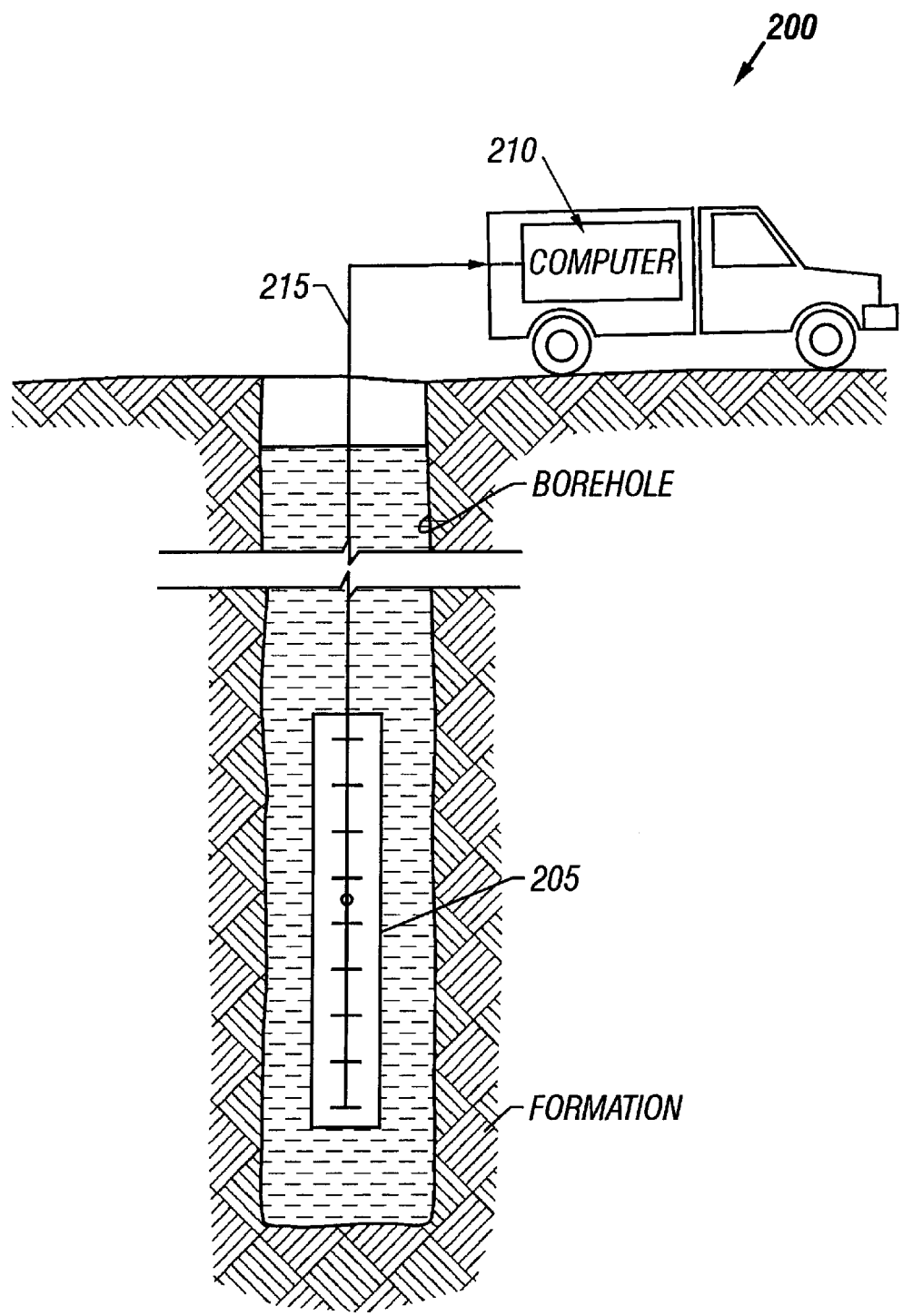
FIG. 9 shows a logging system including a well tool and a computer apparatus in accordance with the present invention.

The present invention may be implemented in a well logging system 200 including a well tool 205 adapted to be moveable through a borehole and an apparatus 210 coupled to the tool 205, as illustrated in FIG. 9 and described in the '605 patent. Certain conventional details are omitted in FIG. 9 for clarity of illustration. The apparatus 210 comprises a surface computer (such as the general-purpose computer and program storage device described above) coupled to the well tool 205 by a wireline cable 215 or linked to the tool string's surface instrumentation as known in the art. The tool 205 may be a propagation or induction well tool that embodies the disclosed coil configurations and conditions. The system may also be implemented in a wireline, or logging-while-drilling ("LWD"), or measurement-while-drilling ("MWD") operation.

The formation conductivity can be determined in real-time by sending the voltage data to the surface as they are acquired, or it can be determined from a recorded-mode by recording the data on a suitable recordable medium. As known in the art, the voltage data are transmitted from the tool 205 to the surface computer 210 by electronics (not shown) housed in the tool 205. The voltage data may be sent to the surface computer 210 along the wireline cable 215 or by MWD telemetry as known in the art. It will be understood that alternative means can be employed for communicating the acquired data to the surface as the precise form of communication is immaterial to the implementation of the disclosed techniques.

Once received by the surface computer 210, the data can be recorded, processed, or computed as desired by the user to generate a formation conductivity profile. The surface computer 210 is capable of producing a conductivity log from the processed conductivity estimators $\sigma_{Grim}{}^j$. The log can then be recorded on a suitable output record medium. Alternatively, some or all of the processing can be performed downhole and the data can be recorded uphole, downhole, or both. It will be understood that the present invention can be implemented in conjunction with any suitable technique for keeping track of the tool 205 depth within a borehole.

Model Examples

Figure 10:
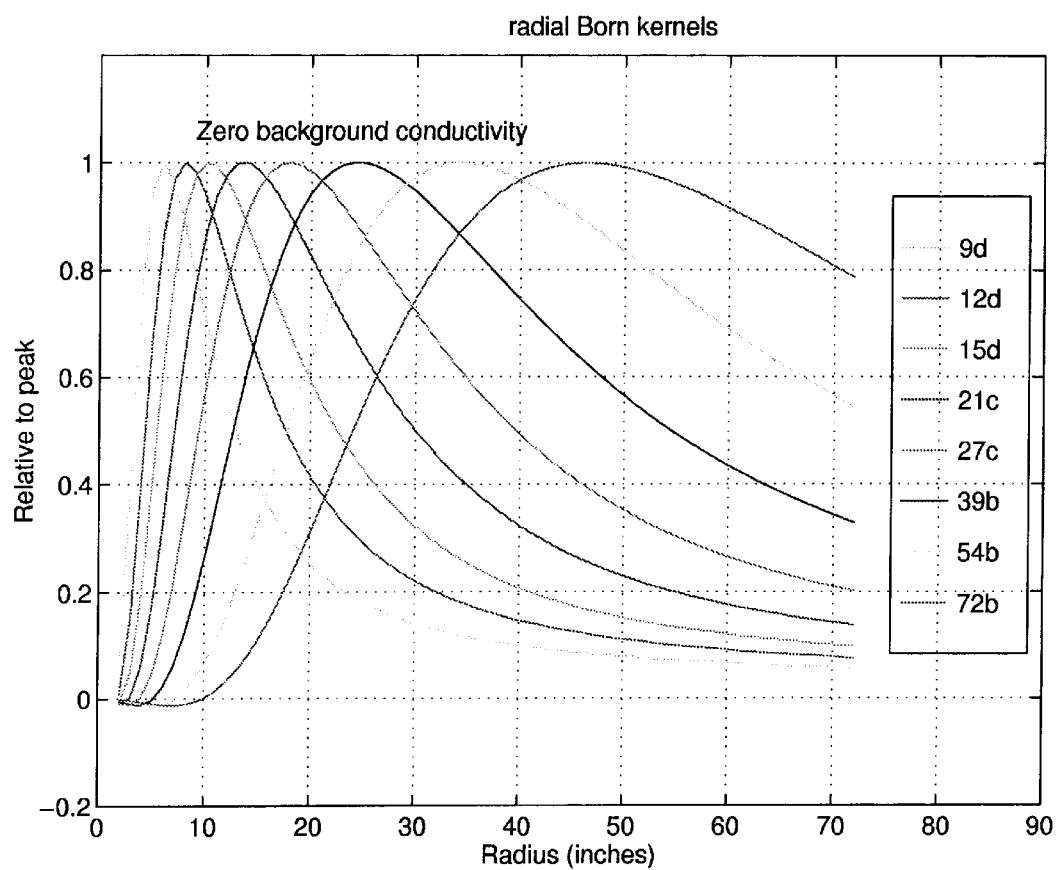
FIG. 10 illustrates graphically the Born radial response function for a well tool design of FIG. 1.
Figure 11:
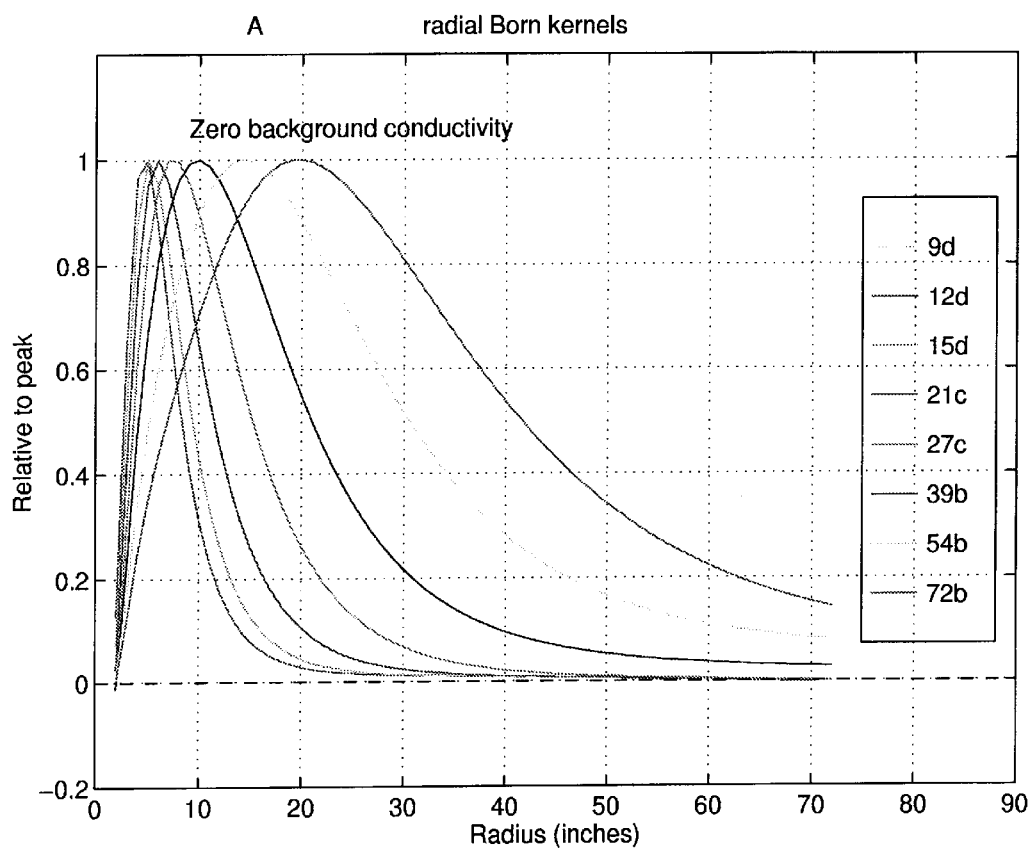
FIG. 11 illustrates graphically the Born radial response function for dip-corrected conductivity data synthesized in accordance with the present invention.
Figure 12:
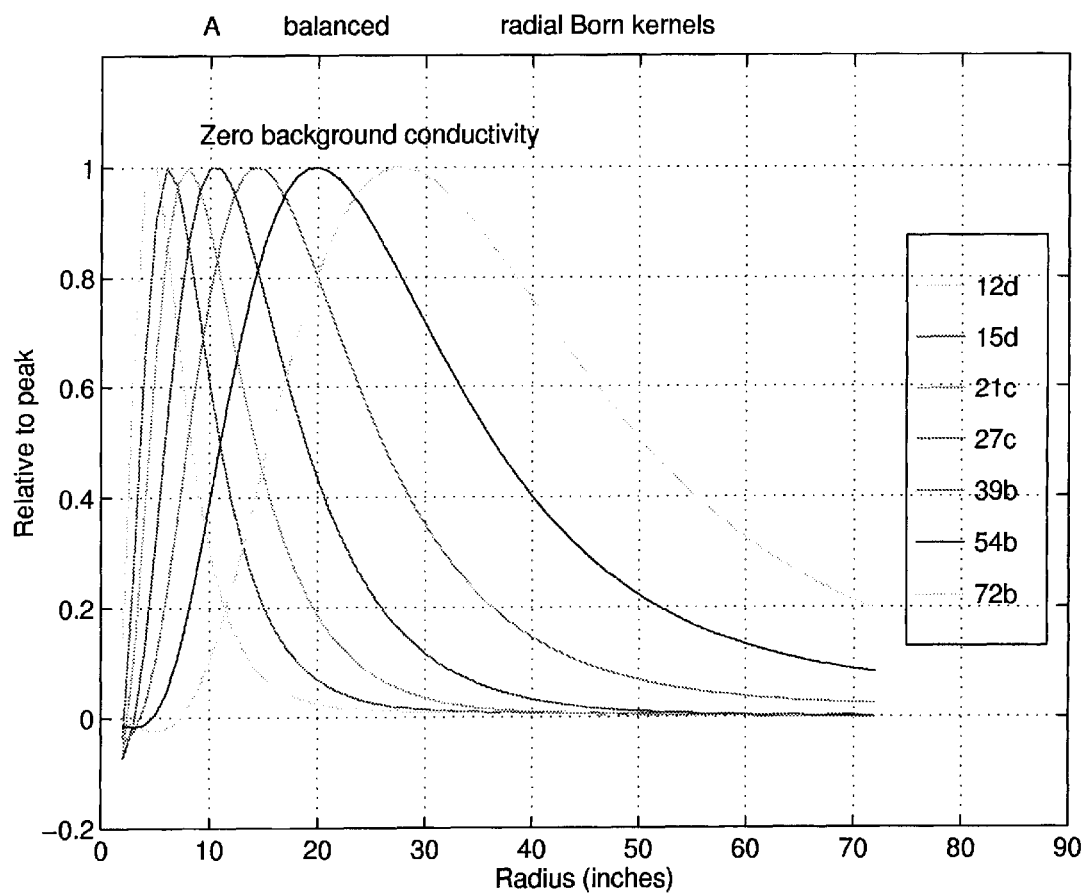
FIG. 12 illustrates graphically the Born radial response function for mutual-balanced dip-corrected conductivity data synthesized in accordance with the present invention.

FIGS. 10 and 11 respectively show the radial Born response functions (Born kernels) for the tool design A and for the synthesized conductivity estimators $\sigma_{Grim}{}^j$. The Born kernels give the sensitivity of the measurement to the conductivity in the formation at different radial distances to the tool's axis. The Born kernels were computed for zero background conductivity and normalized to unit peak response. As seen in FIG. 11, the response curves for the synthesized estimator $\sigma_{Grim}{}^j$ are shallower than for the tool design A measurements, and not as well focused. Turning to FIG. 12, it is seen that for the mutual-balanced processing technique, the radial response is considerably improved.

For the well tool designs A, B of FIG. 1, reliable radial profiling of the formation conductivity can be obtained out to a radius of 60 inches. Radial profiling out to 24 inches should be possible for the estimator $\sigma_{Grim}{}^j$ processed data, and out to 36 inches with the balanced processing technique. However, a caveat is that the balanced processing technique is more sensitive to errors in the measured data.

Processed Examples

Figure 13:
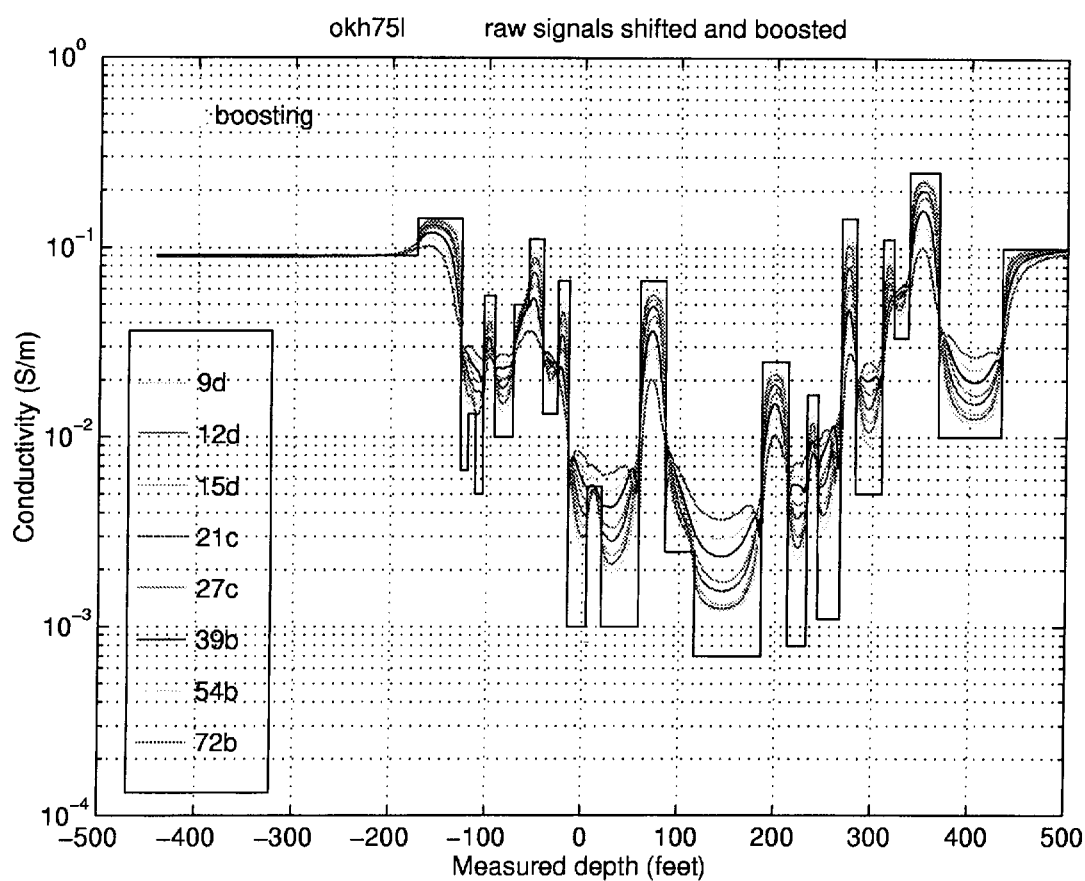
FIG. 13 shows a conductivity log of a computed response of well tool design A of FIG. 1.

In this section, results obtained from computations of test data and actual field data are presented. FIG. 13 shows a conductivity log produced by shifting and boosting a computed response of the tool design A using equation (30). The Oklahoma formation was used (a frequently used test problem to evaluate conductivity processing) in the computation. The dip angle is 75 degrees. Horns are present at the bed boundaries, as often seen in field logs at high dip angle. The logs in the low-conductivity layers are filled in by the adjacent conductive layers (shoulder effect).

Figure 14:
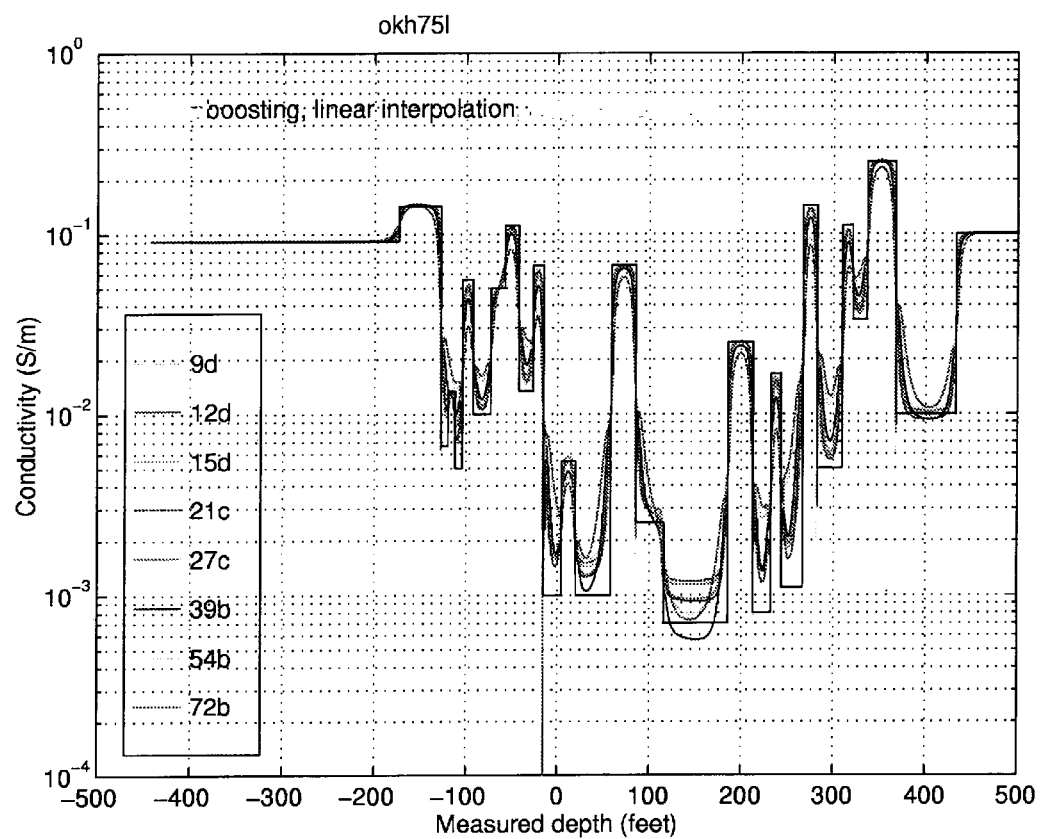
FIG. 14 shows a conductivity log of the same data set of FIG. 13 after application of the dip-correction process of the present invention.
Figure 15:
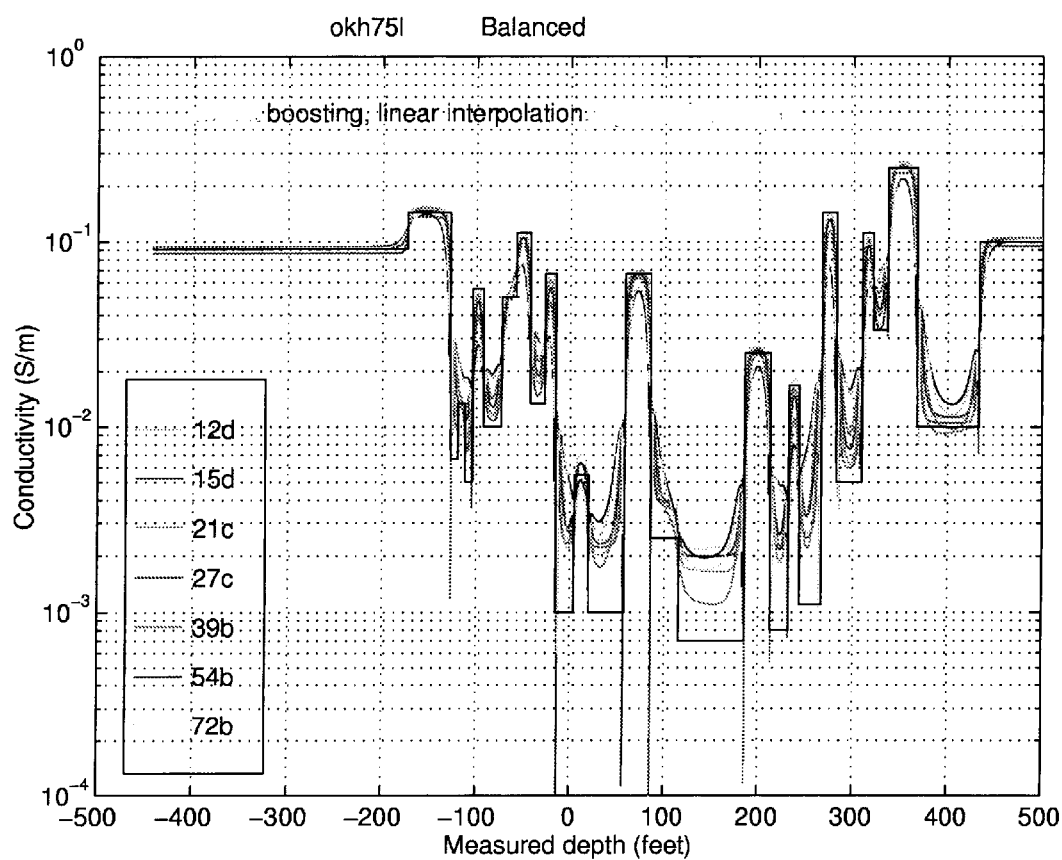
FIG. 15 shows a conductivity log of the same data set of FIG. 13 after application of the mutual-balanced dip-correction process of the present invention.

FIG. 14 shows the results obtained with the same data set of FIG. 13 after applying the process of the present invention. The curves show good resolution matching, and the accuracy of the logs in the resistive layers is considerably improved. Because hydrocarbon-bearing layers usually have a relatively low conductivity, correcting the shoulder effect is desirable for quantitative formation evaluation. FIG. 15 shows the results obtained with the same data set of FIG. 13 after applying the mutual balancing technique. As seen in FIG. 15, there is a visible loss of vertical performance with the mutual balancing technique.

Figure 16:
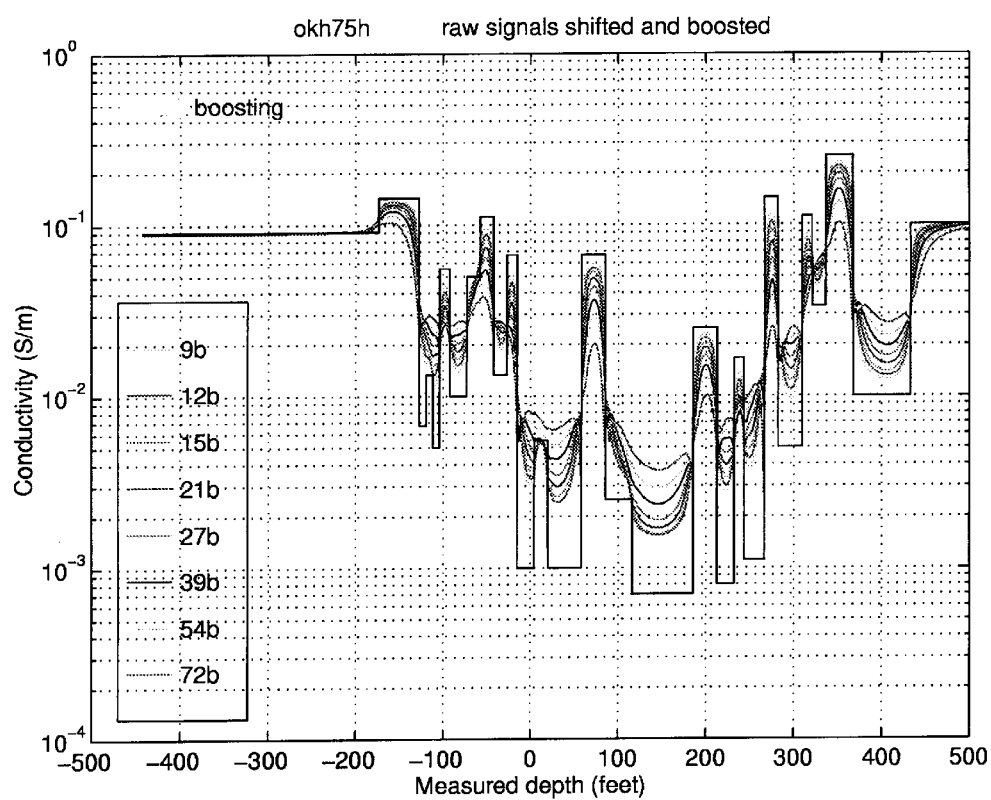
FIG. 16 shows a conductivity log of a computed response of well tool design B of FIG. 1.
Figure 17:
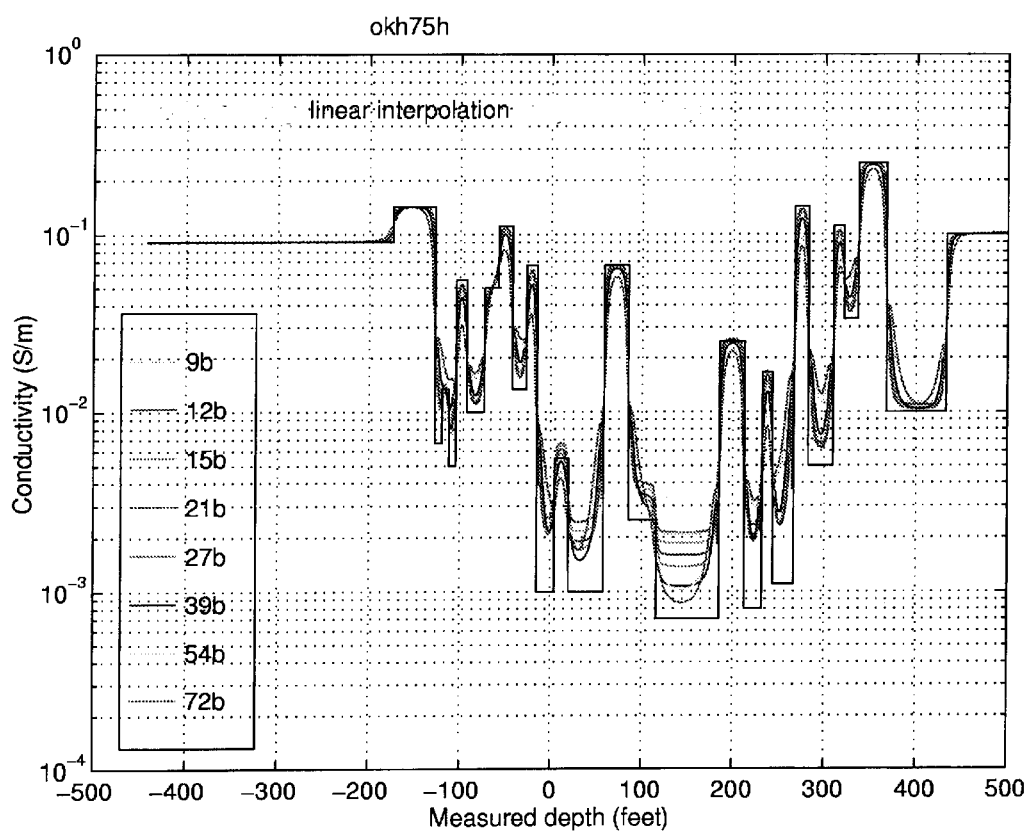
FIG. 17 shows a conductivity log of the same data set of FIG. 16 after application of the dip-correction process of the present invention.
Figure 18:
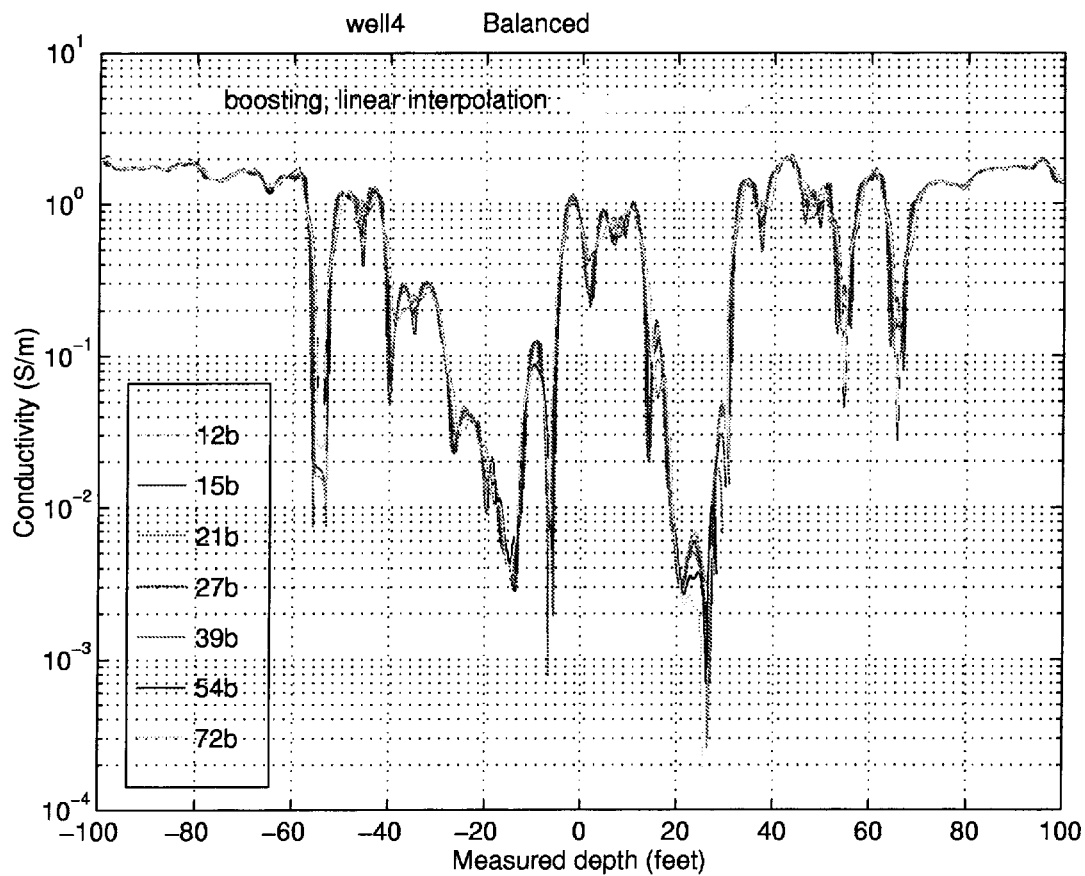
FIG. 18 shows a conductivity log of the same data set of FIG. 16 after application of the mutual-balanced dip-correction process of the present invention.

Similar results are found for the tool design B. FIG. 16 shows a conductivity log produced by shifting and boosting a computed response of the tool design B in the Oklahoma formation. The dip angle is again 75 degrees. FIG. 17 shows the results obtained with the same data set of FIG. 16 after applying the process of the present invention. FIG. 18 shows the results obtained with the same data set of FIG. 16 after applying the mutual balancing technique.

Figure 19:
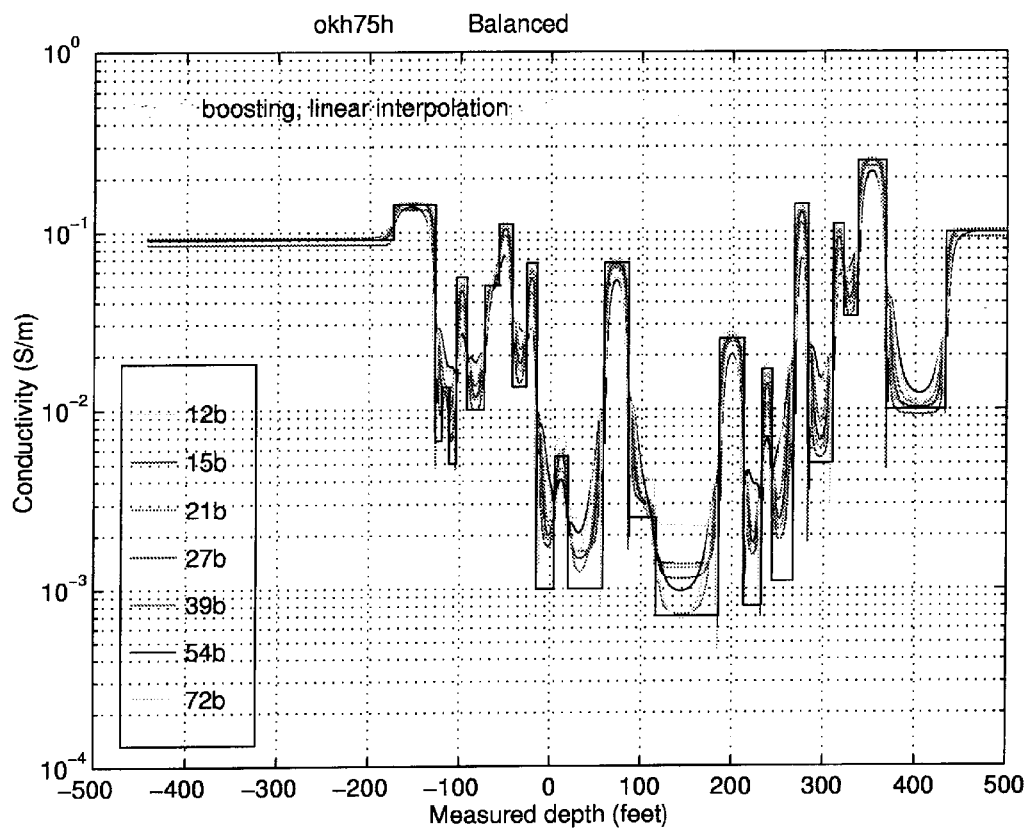
FIG. 19 shows a conductivity log of data from a field log produced by well tool design B of FIG. 1.
Figure 20:
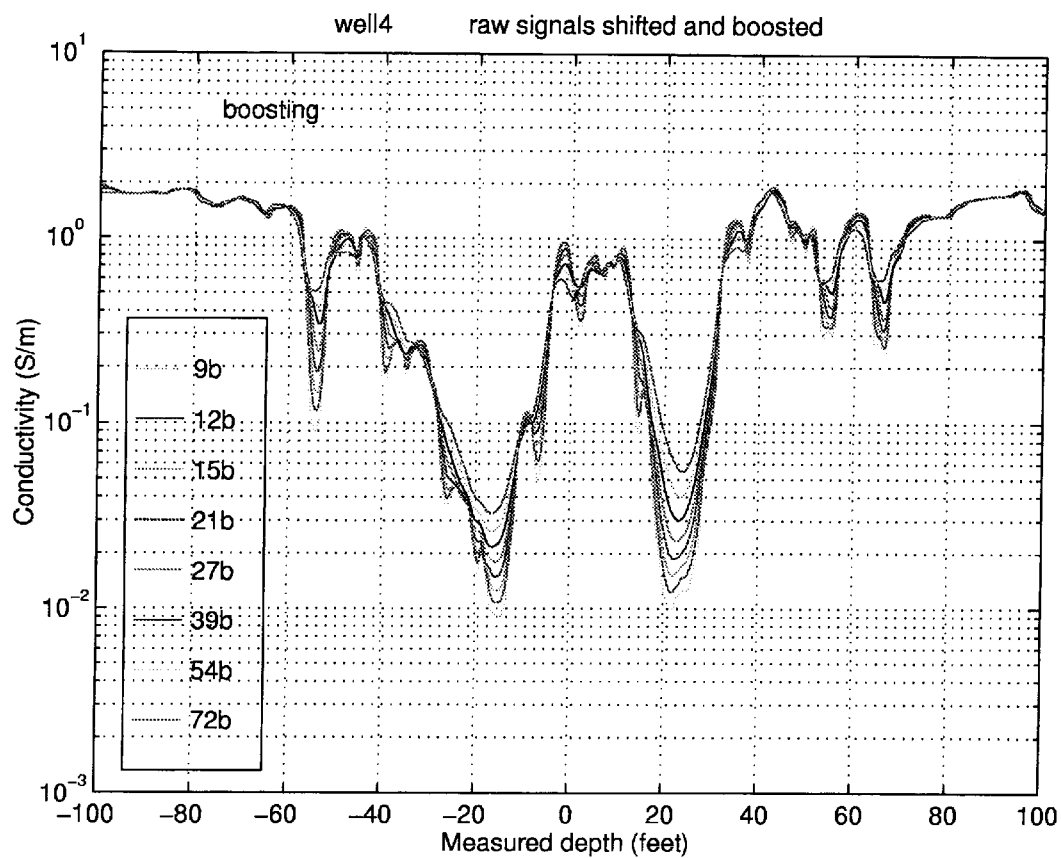
FIG. 20 shows a conductivity log of the same data set of FIG. 19 after application of the dip-correction process of the present invention.
Figure 21:
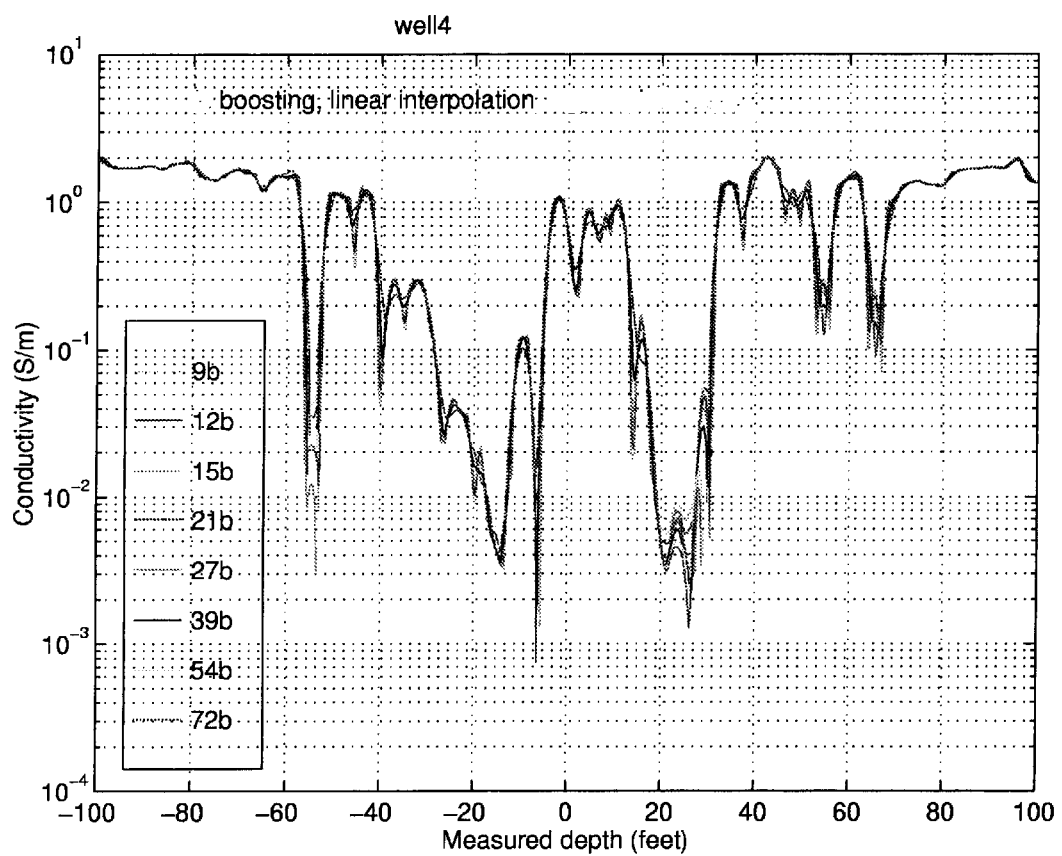
FIG. 21 shows a conductivity log of the same data set of FIG. 19 after application of the mutual-balanced dip-correction process of the present invention.

FIG. 19 shows a conductivity log produced by shifting and boosting a set of raw signals, derived from a tool design B field log, using the least squares equation (29). FIG. 20 shows the results obtained with the same raw signals of FIG. 19 after applying the process of the present invention. As seen in FIG. 20, the processed signals display a dramatic improvement in the vertical resolution, revealing features not clearly seen in the raw data. The processed curves overlay closely, indicating there was no invasion. FIG. 21 shows the results obtained with the same raw signals as FIG. 19 after applying the mutual-balancing technique. The balanced technique also behaves well with this data set, but the vertical resolution is not as sharp.

While the methods and apparatus of this invention have been described as specific embodiments, it will be apparent to those skilled in the art that variations may be applied to the structures and in the steps or in the sequence of steps of the methods described herein without departing from the concept and scope of the invention. All such similar variations apparent to those skilled in the art are deemed to be within this concept and scope of the invention as defined by the appended claims.

What is claimed is:

1. A method for producing a conductivity log unaffected by shoulder effect and dip from voltage data developed by a well tool, where the tool includes a transmitter and a plurality of receiver pairs, when the tool is disposed in a borehole traversing a formation, comprising:

a) accessing the tool voltage data;
   b) boosting the tool voltage data;
   c) reconstructing two-coil voltages from the boosted tool voltage data;
   d) processing the reconstructed two-coil voltages; and
   e) producing the conductivity log from the processed two-coil voltages.

2. The method of claim 1, wherein step (b) comprises performing a least squares minimization technique.

3. The method of claim 1, wherein step (b) comprises:
   i) establishing data values associated with formation conductivity values based on theoretical modeling and referencing the tool voltage data within the established data values to determine conductivity values; and
   ii) recording the conductivity values on an output record medium.

4. The method of claim 1, wherein step (b) comprises calculating the following expression:

$$\sigma_b \approx \frac{1}{K_j}(real\ V_{meas}^j + imag\ V_{meas}^j)$$

where, $V_{meas}^j$ is a tool voltage data value; and $K_j$ is a channel sensitivity factor.

5. The method of claim 1, wherein step (c) comprises shifting the boosted tool voltage data by a predetermined depth shift.

6. The method of claim 1, wherein step (d) comprises interpolating a two-coil voltage to reflect a specific two-coil spacing.

7. The method of claim 1, wherein step (c) comprises calculating the following expression:

$$\upsilon^j = (V^j - N_1^j \upsilon^{j-1})/N_2^j$$

where, $\upsilon^j$ represents a two-coil voltage;

$V^j$ is a tool voltage data value from a tool channel j; and $N_1^j$, $N_2^j$ are the respective number of turns on first and second receiver coils.

8. The method of claim 7, wherein step (c) comprises estimating an initial value for $\upsilon^1$.

9. The method of claim 1, wherein step (d) comprises shifting the reconstructed two-coil voltages by a predetermined depth shift.

10. The method of claim 1, wherein step (d) comprises calculating the following expression:

$$\sigma_{Grim}^j = \frac{1}{k_j}\frac{\Delta\upsilon^j}{\Delta q_j}$$

where, $\upsilon^j$ is a two-coil voltage;

$k_j$ is a sensitivity factor sensitivity factor of a two-coil channel;

$q_j$ is a receiver-to-transmitter spacing; and $\Delta$ indicates calculating the difference.

11. The method of claim 10, step (d) further comprising storing the calculated values of $\sigma_{Grim}^j$.

12. The method of claim 11, step (d) further comprising combining the stored values of $\sigma_{Grim}^j$ to produce a condition of mutual balance.

13. The method of claim 10, further comprising recording the calculated values of $\sigma_{Grim}^j$ on an output record medium.

14. A program storage device readable by a processor and encoding a program of instructions including instructions for performing the operations recited in claim 1.

15. A well logging system including a well tool adapted to be moveable through a borehole and an apparatus adapted to be coupled to the tool, the tool including at least one transmitter and a plurality of receiver pairs where each receiver pair develops tool voltage data from energy transmitted by each at least one transmitter, the apparatus being adapted to respond to the tool voltage data for producing a conductivity log unaffected by shoulder effect and dip and for recording the log on an output record medium, the apparatus comprising:

means for accessing the tool voltage data;

means for boosting the tool voltage data;

means for reconstructing two-coil voltages from the boosted tool voltage data;

means for processing the reconstructed two-coil voltages; and means for producing the conductivity log from the processed two-coil voltages.

16. The system of claim 15, wherein the means for boosting the tool voltage data further comprises means for performing a least squares minimization technique.

17. The system of claim 15, wherein the mean for boosting the tool voltage data further comprises:

means for establishing data values associated with formation conductivity values based on theoretical modeling and referencing the tool voltage data within the established data values to determine conductivity values; and means for recording the conductivity values on an output record medium.

18. The system of claim 15, wherein the means for boosting the tool voltage data further comprises means for calculating the following expression:

$$\sigma_b \approx \frac{1}{K_j}(real\ V_{meas}^j + imag\ V_{meas}^j)$$

where, $V_{meas}^j$ is a tool voltage data value; and $K_j$ is a channel sensitivity factor.

19. The system of claim 15, wherein the means for reconstructing two-coil voltages further comprises means for shifting the boosted tool voltage data by a predetermined depth shift.

20. The system of claim 15, wherein the means for processing the reconstructed two-coil voltages further comprises means for interpolating a two-coil voltage to reflect a specific two-coil spacing.

21. The system of claim 15, wherein the means for reconstructing two-coil voltages further comprises means for calculating the following expression:

$$\upsilon^j = (V^j - N_1^j \upsilon^{j-1})/N_2^j$$

where, $\upsilon^j$ represents a two-coil voltage;

$V^j$ is a tool voltage data value from a tool channel j; and $N_1^j$, $N_2^j$ are the respective number of turns on first and second receiver coils.

22. The system of claim 21, wherein the means for reconstructing two-coil voltages further comprises means for estimating an initial value for $\upsilon^1$.

23. The system of claim 15, wherein the means for processing further comprises means for shifting the reconstructed two-coil voltages by a predetermined depth shift.

24. The system of claim 15, wherein the means for processing the reconstructed two-coil voltages further comprises means for calculating the following expression:

$$\sigma_{Grim}^j = \frac{1}{k_j}\frac{\Delta\upsilon^j}{\Delta q_j}$$

where, $\upsilon^j$ is a two-coil voltage;

$k_j$ is a sensitivity factor of a two-coil channel;

$q_j$ is a receiver-to-transmitter spacing; and $\Delta$ indicates calculating the difference.

25. The system of claim 24, wherein the means for processing the reconstructed two-coil voltages further comprises means for storing the calculated values of $\sigma_{Grim}^j$.

26. The system of claim 25, wherein the means for processing the reconstructed two-coil voltages further comprises means for combining the stored values of $\sigma_{Grim}{}^j$ to produce a condition of mutual balance.

27. The system of claim 24, wherein the means for processing the reconstructed two-coil voltages further comprises means for recording the calculated values of $\sigma_{Grim}{}^j$ on an output record medium.

28. An article of manufacture for use in connection with a computer, the article of manufacture comprising a computer-readable storage medium encoding therein a program of instructions which cause the computer to:

(i) access data associated with voltage values developed by a well tool;

(ii) boost the voltage data;

(iii) reconstruct two-coil voltages from the boosted voltage data;

(iv) process the reconstructed two-coil voltages; and (v) produce a conductivity log from the processed two-coil voltages.

* * * * *